(12) United States Patent
Cregg

(10) Patent No.: US 9,985,796 B2
(45) Date of Patent: May 29, 2018

(54) SMART SENSOR ADAPTIVE CONFIGURATION SYSTEMS AND METHODS USING CLOUD DATA

(71) Applicant: SmartLabs, Inc., Irvine, CA (US)

(72) Inventor: Daniel Brian Cregg, Newport Beach, CA (US)

(73) Assignee: SmartLabs, Inc., Irvine, CA (US)

( * ) Notice: Subject to any disclaimer, the term of this patent is extended or adjusted under 35 U.S.C. 154(b) by 480 days.

(21) Appl. No.: 14/577,125

(22) Filed: Dec. 19, 2014

(65) Prior Publication Data

US 2016/0177546 A1 Jun. 23, 2016

(51) Int. Cl.
| | |
|---|---|
| G05B 11/12 | (2006.01) |
| H04L 12/28 | (2006.01) |
| H04B 3/54 | (2006.01) |
| G05B 11/01 | (2006.01) |
| H04L 12/64 | (2006.01) |

(52) U.S. Cl.
CPC ........ *H04L 12/2816* (2013.01); *G05B 11/012* (2013.01); *H04B 3/54* (2013.01); *H04L 12/6418* (2013.01)

(58) Field of Classification Search
CPC ..... G05B 11/012; H04B 3/54; H04L 12/2816; H04L 12/6418
See application file for complete search history.

(56) References Cited

U.S. PATENT DOCUMENTS

| | | | |
|---|---|---|---|
| 6,553,336 B1 | 4/2003 | Johnson et al. | |
| 7,046,642 B1 | 5/2006 | Cheng et al. | |
| 7,069,490 B2 | 6/2006 | Niu et al. | |
| 7,233,573 B2 | 6/2007 | Walls et al. | |
| 7,286,511 B2 | 10/2007 | Zhong et al. | |
| 7,345,998 B2 | 3/2008 | Cregg et al. | |
| 7,663,502 B2 | 2/2010 | Breed | |
| 7,904,187 B2 | 3/2011 | Hoffberg | |
| 8,081,649 B2 | 12/2011 | Cregg et al. | |
| 8,190,275 B2 | 5/2012 | Chang | |
| 8,301,180 B1 | 10/2012 | Gailloux | |
| 8,350,697 B2 | 1/2013 | Trundle et al. | |
| 8,452,457 B2* | 5/2013 | Matsuoka | H04L 12/2825 236/46 R |
| 8,495,244 B2 | 7/2013 | Bonar | |
| 8,516,087 B2 | 8/2013 | Wilson | |
| 8,533,144 B1* | 9/2013 | Reeser | G06Q 30/02 705/14.53 |
| 8,610,305 B2 | 12/2013 | Sarid | |

(Continued)

FOREIGN PATENT DOCUMENTS

WO    WO 2006/065275    6/2006

OTHER PUBLICATIONS

Insteon—White Paper: The Details, Insteon, 2013.
(Continued)

*Primary Examiner* — Thomas Lee
*Assistant Examiner* — Mohammad A Rahman
(74) *Attorney, Agent, or Firm* — Knobbe, Martens, Olson & Bear, LLP

(57) ABSTRACT

A cloud server associated with a plurality of home-control network, downloads sensor data, Internet data, and data from network devices outside the user's home-control network, and analyzes the data to control water valves and leak detectors within the user's home-control network.

18 Claims, 26 Drawing Sheets

(56) References Cited

U.S. PATENT DOCUMENTS

| | | |
|---|---|---|
| 8,619,819 B2 | 12/2013 | Seelman |
| 8,653,935 B2 | 2/2014 | Baker |
| 8,804,584 B2 | 8/2014 | Stewart |
| 8,918,461 B2 | 12/2014 | Rimmer et al. |
| 8,935,533 B2 | 1/2015 | Kim et al. |
| 9,014,067 B2 | 4/2015 | Chun |
| 9,014,708 B2 | 4/2015 | He et al. |
| 9,054,892 B2 | 6/2015 | Lamb |
| 9,071,453 B2 | 6/2015 | Shoemaker |
| 9,078,087 B2 | 7/2015 | Yoon |
| 9,081,501 B2 | 7/2015 | Asaad et al. |
| 9,094,224 B2 | 7/2015 | Olofsson et al. |
| 9,130,910 B1* | 9/2015 | Logue ............... H04L 63/0428 |
| 9,143,962 B2 | 9/2015 | Brady |
| 9,148,443 B2 | 9/2015 | Chizeck |
| 9,293,036 B2 | 3/2016 | Trundle |
| 9,300,484 B1 | 3/2016 | Cregg et al. |
| 9,426,220 B2 | 8/2016 | Chauhan et al. |
| 9,485,677 B2 | 11/2016 | Lightstone et al. |
| 9,578,443 B2 | 2/2017 | Cregg et al. |
| 2003/0103521 A1 | 6/2003 | Raphaeli et al. |
| 2003/0142685 A1 | 7/2003 | Bare |
| 2004/0131125 A1 | 7/2004 | Sanderford et al. |
| 2004/0155784 A1 | 8/2004 | Candela |
| 2004/0243684 A1 | 12/2004 | Ha et al. |
| 2005/0035854 A1 | 2/2005 | Gupta et al. |
| 2006/0104291 A1* | 5/2006 | Rodriguez ............... H04B 3/54 370/401 |
| 2006/0126617 A1 | 6/2006 | Cregg et al. |
| 2006/0271695 A1* | 11/2006 | Lavian ................ G06F 21/552 709/229 |
| 2011/0032423 A1 | 2/2011 | Jing et al. |
| 2011/0178644 A1 | 7/2011 | Picton |
| 2011/0208359 A1 | 8/2011 | Duchene et al. |
| 2013/0090770 A1 | 4/2013 | Lee et al. |
| 2013/0197921 A1* | 8/2013 | Shudark ................ H02J 3/14 705/1.1 |
| 2013/0238144 A1 | 9/2013 | Shahapurkar et al. |
| 2014/0022061 A1 | 1/2014 | Apte |
| 2014/0023556 A1 | 1/2014 | Jiang |
| 2014/0219193 A1 | 8/2014 | Linde |
| 2014/0266669 A1 | 9/2014 | Fadell et al. |
| 2014/0269425 A1 | 9/2014 | Fisher |
| 2014/0280398 A1 | 9/2014 | Smith et al. |
| 2014/0321268 A1 | 10/2014 | Saltsidis |
| 2014/0324410 A1 | 10/2014 | Mathews et al. |
| 2015/0019659 A1 | 1/2015 | Eidelson et al. |
| 2015/0025697 A1* | 1/2015 | Imes ..................... H04L 67/42 700/286 |
| 2015/0052253 A1* | 2/2015 | Johnson ............ H04L 61/1511 709/226 |
| 2015/0061859 A1 | 3/2015 | Matsuoka et al. |
| 2015/0100167 A1 | 4/2015 | Sloo et al. |
| 2015/0120000 A1 | 4/2015 | Coffey et al. |
| 2015/0168933 A1* | 6/2015 | Klein ..................... G05B 15/02 700/16 |
| 2015/0179027 A1* | 6/2015 | Lee ......................... G08B 3/10 340/635 |
| 2015/0204569 A1 | 7/2015 | Lorenz et al. |
| 2015/0228419 A1* | 8/2015 | Fadell .................... G08B 17/00 307/112 |
| 2015/0241860 A1 | 8/2015 | Raid |
| 2015/0244591 A1 | 8/2015 | Brown |
| 2015/0276238 A1* | 10/2015 | Matsuoka ............. G05B 15/02 700/278 |
| 2015/0295949 A1 | 10/2015 | Chizeck et al. |
| 2015/0316287 A1 | 11/2015 | Orozco-Pérez |
| 2015/0324706 A1 | 11/2015 | Warren |
| 2015/0356859 A1 | 12/2015 | Hwang et al. |
| 2015/0370272 A1* | 12/2015 | Reddy .................... G05B 15/02 700/278 |
| 2015/0372834 A1* | 12/2015 | Karp ...................... G05B 15/02 700/276 |
| 2015/0373565 A1 | 12/2015 | Savavi |
| 2016/0044456 A1 | 2/2016 | Lott et al. |
| 2016/0165663 A1 | 6/2016 | Shanmugam et al. |
| 2016/0179104 A1 | 6/2016 | Cregg |
| 2016/0179105 A1 | 6/2016 | Cregg |
| 2016/0182246 A1 | 6/2016 | Cregg |
| 2016/0182247 A1 | 6/2016 | Cregg |
| 2016/0195861 A1* | 7/2016 | Chen ................... H04L 12/2816 700/275 |
| 2016/0261538 A1 | 9/2016 | Cregg |
| 2017/0127124 A9* | 5/2017 | Wilson ............ H04N 21/43615 |
| 2017/0194789 A1* | 7/2017 | Chen ........................ H02J 3/14 |

OTHER PUBLICATIONS

"Refresh! Insteon Technology," Electronic Design (EE) Product News, Staff Article, Apr. 5, 2006.

Malaysian Notice of Allowance, re MY Application No. PI 2012003571, dated Apr. 15, 2016.

* cited by examiner

1700

| Center Frequency | 915 MHz |
|---|---|
| Data Encoding Method | Mancester |
| Modulation Method | FSK |
| FSK Deviation | 64 KHz |
| FSK Symbol Rate | 76,800 symbols per second |
| Data Rate | 38,400 bits per second |
| Range | 150 feet outdoors |

FIG. 32

SMART SENSOR ADAPTIVE CONFIGURATION SYSTEMS AND METHODS USING CLOUD DATA

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND

Communication among low-cost devices is useful in many applications. For example, in a home environment, room occupancy sensors, light switches, lamp dimmers, and a gateway to the Internet can all work together if they are in communication. Residents of the home interact with the home-control system for monitoring and control. A user could, through a user-interface, configure the home-control system to illuminate a room in a home when people are present, and sound an alarm, depending on conditions the user sets up, for example.

SUMMARY

As the number of controllable devices in the home rises, the possible actions between the devices become increasingly complex. If the user desires to utilize various combinations of device interactions, then the setup of the home-control network also increases in complexity. Thus, it is desirable to simplify the user interaction with the home-control network while utilizing the complex device interactions.

The cloud server downloads sensor information from the Internet, such as traffic patterns, weather information, and utility rates, for example. The cloud server can also receive sensor information from social media, such as Facebook®, and the like, associated with the user or others, and information from the user's smart phone, car, or work computer, for example. Further, the cloud server receives local network actions as well as the network actions from a plurality of home-control networks across a large geographic area, which can be subdivided with increasing granularity. In an embodiment, the cloud server receives the network actions from geographically close or neighboring home-control networks.

The cloud server aggregates the device actions. From the aggregate of the device actions, the cloud server creates snapshot behaviors, learned sequences, scenes, and timers, which can be continuously updated. The cloud server sends commands to the device via the network controller based on the sensor information to implement the snapshots, sequences, scenes, and timers.

For example, if the aggregate actions indicate that the hot tub heater is set to 100° C. fifteen minutes after the front door opens on sunny weekday afternoons, then the cloud server can send commands to the hot tub heater to turn on and set the water temperature to 100° C. when the weather is sunny, it is a weekday, and the user's smartphone is within a specified geo-fencing ring.

In addition, the cloud server can implement load-shedding behavior based on utility rates or a user-set sliding scale between comfort and economy. Further, analysis of network activity of others and broader web data allow learning and adjusting device behaviors based on such things as local neighborhood activity, and broader social connected activity. For example, the cloud server could use the neighbors' overall power usage to adjust the use of power on the user's home-control network. The cloud server could access friends' scenes for suggestions or improvements on the user's scenes.

The user can interface with the cloud server where the cloud server can send the device behavior to the device through the network controller and the network.

According to a number of embodiments, the disclosure relates to a method to automatically control a water valve on a user's home-control network. The method comprises electronically receiving network data from a plurality of home-control networks. Each home-control network comprises a network controller and at least a water valve. The home-control network is configured to propagate messages, and the messages comprise commands to control a state of the water valve. The method further comprises aggregating the network data associated with the state of water valves from the plurality of home-control networks within a geographic area of the user's home control network, receiving weather information for the geographic area from a weather service over a global network, receiving location information comprising a location of a user from a geo-location device over the global network, and automatically controlling the water valve on the user's home-control network based at least in part on the aggregated network data, the weather information, and the location information.

In an embodiment, the method further comprises determining, based on the aggregated network data, whether a number of the water valves associated with the plurality of home-control networks within the geographic area have been enabled to drain water pipes. In another embodiment, the method further comprises determining, based on the weather information, whether a freeze event is expected within a time period. In a further embodiment, the method further comprises determining, based on the location information, whether the user is away from the user's home-control network. In a yet further embodiment, the method further comprises automatically controlling the water valve on the user's home-control network to drain water from the pipes when the number is greater than a threshold, the freeze event is expected within the time period, and the user is away.

In an embodiment, the method further comprises sending a message over the global network to the network controller associated with the user's home-control network, where the message comprises a command configured to control the water valve on the user's home-control network. In another embodiment, the network controller associated with the user's home-control network is configured to send the message to the water valve on the user's home-control network using at least one of the powerline signaling and the RF signaling. In a further embodiment, the method further comprises sending a notification to the user reporting the state of the water valve on the user's home control network after automatically controlling the water valve. In a yet further embodiment, the method further comprises sending a request to the user before automatically controlling the water valve.

Certain embodiments relate to a system to automatically control a water valve on a user's home-control network. The system comprises cloud-based computer hardware configured to receive network data from a plurality of home-control networks. Each home-control network comprises a network controller and at least a water valve, where the home-control network is configured to propagate messages, and the messages comprise commands to control a state of the water valve. The cloud-based computer hardware is configured to aggregate the network data associated with the state of water valves from the plurality of home-control networks within a geographic area of the user's home control network, to receive weather information for the geographic area from a weather service over a global network and to receive location information comprising a location of a user from a geo-location device over the global network, to analyze the aggregated network data, the weather information, and the location information, and to generate a message to control the state of the water valve on the user's home-control network based at least in part on the analysis.

In an embodiment, the cloud-based computer hardware is further configured to determine, based on the aggregated network data, whether a number of the water valves associated with the plurality of home-control networks within the geographic area have been enabled to drain water pipes. In another embodiment, the cloud-based computer hardware is further configured to determine, based on the weather information, whether a freeze event is expected within a time period. In a further embodiment, the cloud-based computer hardware is further configured to determine, based on the location information, whether the user is away from the user's home-control network. In a yet further embodiment, the cloud-based computer hardware is further configured to automatically control the water valve on the user's home-control network to drain water from the pipes when the number is greater than a threshold, the freeze event is expected within the time period, and the user is away.

In an embodiment, the cloud-based computer hardware is further configured to send a message over the global network to the network controller associated with the user's home-control network, the message comprising a command configured to control the water valve on the user's home-control network. In another embodiment, the network controller associated with the user's home-control network is configured to send the message to the water valve on the user's home-control network using at least one of the powerline signaling and the RF signaling. In a further embodiment, the cloud-based computer hardware is further configured to send a notification to the user reporting the state of the water valve on the user's home control network. In a yet further embodiment, the cloud-based computer hardware is further configured to send a request to the user to control the water valve.

In an embodiment, the messages are propagated using powerline signaling and radio frequency (RF) signaling, wherein the powerline signaling comprises message data modulated onto a carrier signal and the modulated carrier signal is added to a powerline waveform, and wherein the RF signaling comprises the message data modulated onto an RF waveform.

For purposes of summarizing the disclosure, certain aspects, advantages, and novel features of the inventions have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

BRIEF DESCRIPTION OF THE DRAWINGS

FIG. 32 is a table of exemplary specifications for RF signaling within the network, according to certain embodiments.

DETAILED DESCRIPTION

The features of the systems and methods will now be described with reference to the drawings summarized above. Throughout the drawings, reference numbers are re-used to indicate correspondence between referenced elements. The drawings, associated descriptions, and specific implementation are provided to illustrate embodiments of the inventions and not to limit the scope of the disclosure.

The embodiments described herein may comprise one or more of a sequence, a scene, and a timer. In an embodiment, a snapshot comprises a memorization of functional variables at a specific moment. For example, a user sets a thermostat to 78° C., selects cool mode, and then links the thermostat as part of a scene. The states of 78° C. and cool mode are memorized as part of the scene, then restored upon activation of the scene.

In another embodiment, a sequence comprises a memorized set of steps and variables that are started at a specific point and concluded after a desired number of iterations. There may be conditional logic statements within the steps of the sequence that change the way the sequence performs. For example, a thermostat may react to a network trigger by incrementing one degree, waiting a period of time, then incrementing again in order to reach a desired temperature. The thermostat raises the temperature gradually, over a period of time, instead of at the maximum rate of the HVAC system. The sequence concludes once the desired temperature has been reached.

In a further embodiment, a timer is a type of snapshot or sequence that is triggered by a real time clock reaching a selected time. For example, the thermostat in the previous scene and sequence examples could be triggered to reach the desired temperature at a selected time of day.

Cloud Server Adaptive Learning

Figure 1:
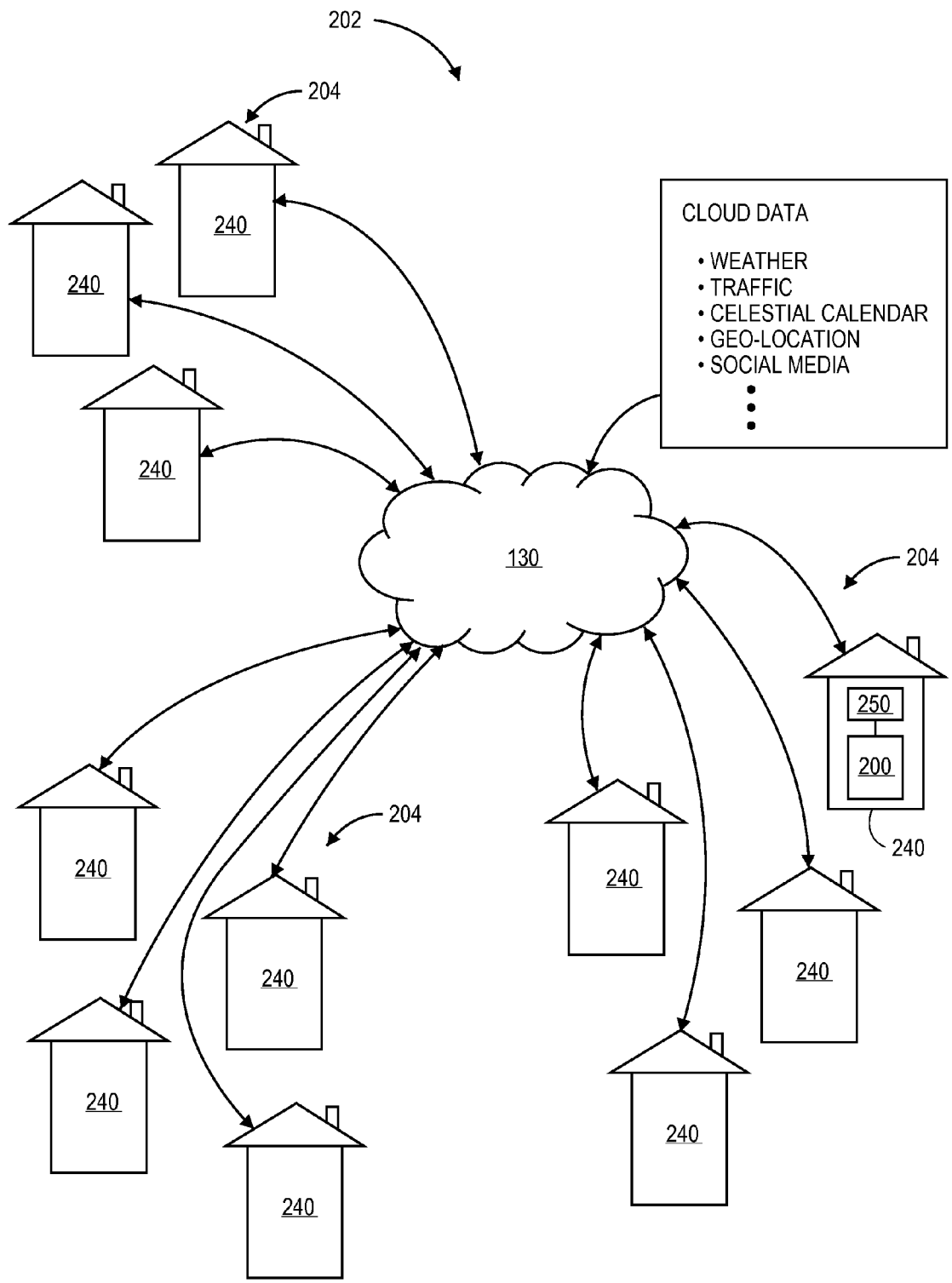
FIG. 1 illustrates a cloud server system comprising a plurality of neighborhoods' of home-control networks, according to certain embodiments.

FIG. 1 illustrates an adaptive learning system 202 comprising a cloud server 130 and a plurality of neighborhoods 204, where each neighborhood 204 comprises one or more communication systems 240. In an embodiment, neighborhoods 204 comprise one or more communication systems 240 within a geographic area. The communication system 240 comprises a network controller or hub 250 and a network 200. In an embodiment, the communication system 240 comprises a home-control communication system and the network 200 comprises a home-control network.

The communication system 240 is configured to propagate data and/or commands from the network controller or hub 250 to network devices and to propagate messages from the network devises to the network controller or hub 250. The communication system 240 is further configured to communicate with the cloud server 130 and with a user via a remote intelligent device, such as a smart phone, a personal computer, a laptop, a notebook, a tablet, or the like.

In other embodiments, the network 200 and/or communication system 240 can provide communication between the network controller 250 and one or more network devices in one or more facilities, buildings, residences, factories, stores, commercial facilities, industrial facilities, rooms, offices, zoned areas, subsystems, floors in a building, parking structures, stadiums, theatres, or the like, and is not limited to residences, homes, houses or the like.

The user can interact directly with the network controller 250 through the network controller's user interface, or the user can interface with the cloud server 130 where the cloud server 130 can send the device behavior to the network controller 250 or to the network device through the network controller 250 and the home-control network 200.

In an embodiment, the network 200 comprises a dual-band mesh area networking topology to communicate with network devices located within the network 200. In an embodiment, the network 200 comprises a home-control network. In an embodiment, the network 200 comprises an INSTEON® network utilizing an INSTEON® engine employing a powerline protocol and an RF protocol, which are described below in FIGS. 17-22. The network devices can comprise, for example, light switches, thermostats, motion sensors, and the like. INSTEON® devices are peers, meaning each network device can transmit, receive, and repeat any message of the INSTEON® protocol, without requiring a master controller or routing software.

The network controller 250 sends messages to and receives messages from the cloud server 130. Each network controller 250 sends network status associated with the corresponding network 200 to the cloud server 130. Further, each network controller 250 sends device status of the devices on the corresponding network 200 to the cloud server. In an embodiment, the device status and/or network status comprises one or more of a state of the network devices, commands sent to the network devices, responses from the network devices, queries from the network devices, and the like.

The cloud server 130 comprises a logical server that is built, hosted, and delivered through a cloud-computing platform over the Internet. In an embodiment, the cloud server 130 comprises a processor and memory. The memory comprises one or more databases and one or more web-based applications or programs where the processor is configured to access the databases and execute the programs to provide communication between the web-based applications and databases and the network controller 250. In an embodiment, the cloud server 130 receives messages and data from the plurality of network controllers 250 and is configured to aggregate the received messages and data. In an embodiment, the cloud server 130 aggregates the received messages and data according to a geographic area. The geographic area can be, for example, a home's neighboring houses, one or more streets, a city, a county, a state, and the like.

Further, the cloud server 130 receives cloud data from one or more websites or Internet accessible services. Examples of cloud data are weather data, traffic data, a celestial calendar such as a solar calendar or a lunar calendar, geographical location data, such as data from a geo-tracking device, social media communications, and the like.

In an embodiment, the cloud server 130 analyzes the aggregated network data from one or more networks 200. In another embodiment, the cloud server 130 accesses and analyzes the cloud data. In yet another embodiment, the cloud server 130 analyzes the aggregated network data and the cloud data. Based at least in part on the analysis, the cloud server 130 determines whether to send a message to the network device on the network 200 via the network controller 250 to control the network device. In an embodiment, the message comprises one of more of commands and data.

Figure 2:
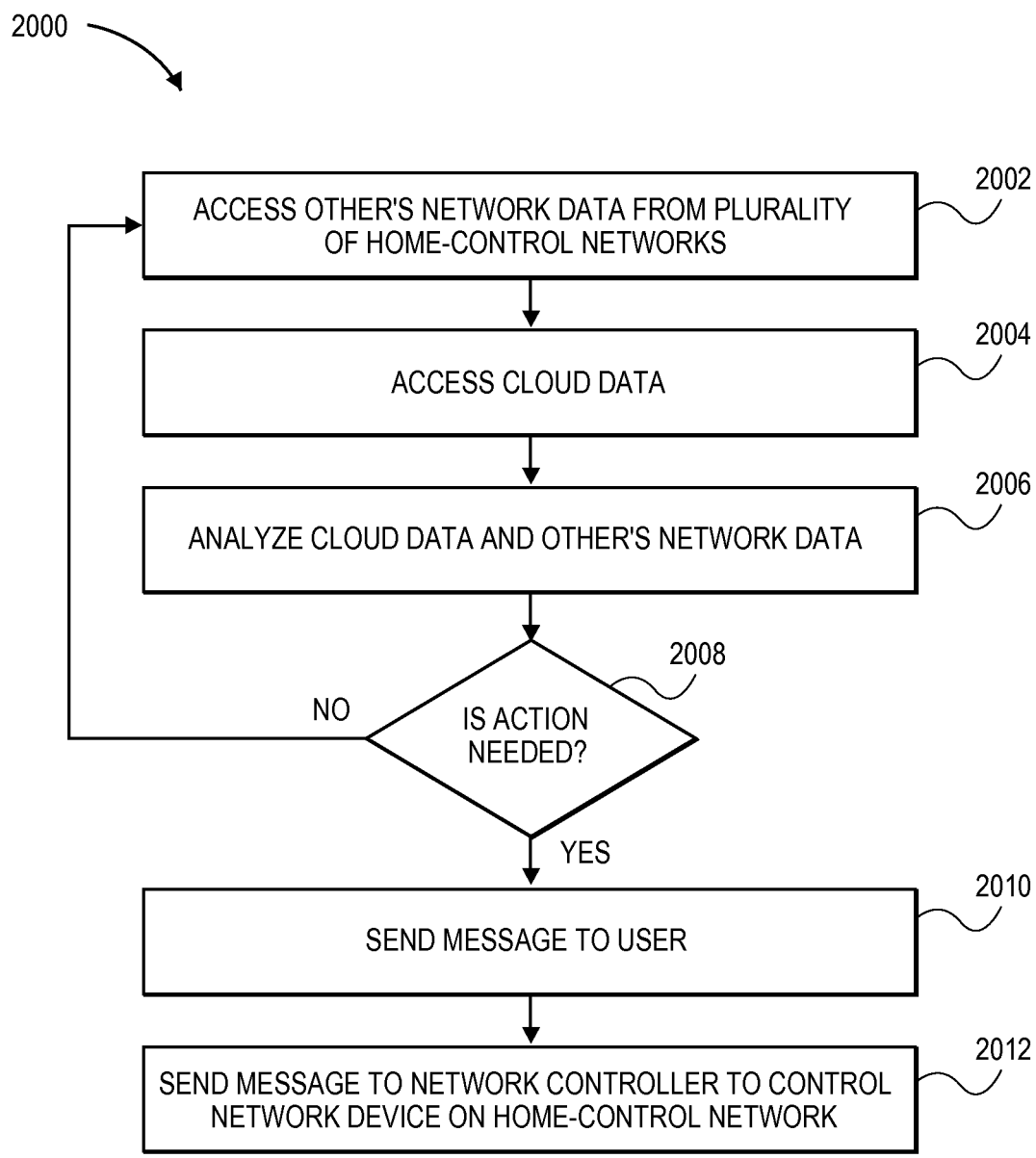
FIG. 2 illustrates an adaptive learning process for a cloud server, according to certain embodiments.

FIG. 2 illustrates an adaptive learning process 200 for the cloud server 130. Beginning at step 2002, the cloud server 130 accesses the network data from the plurality of home-control communication systems 240. In an embodiment, the server 130 aggregates the data based on user-selected factors, such as geographic area, time of year, time of day, type of data, for example. At step 2004, the cloud server 130 accesses the cloud data, such as weather data, traffic data, social media messages, for example.

At step 2006, the cloud server 130 analyzes the network data and/or the cloud data. At step 2008, the cloud server 130 determines whether to take an action to control a device on the network 200 based at least in part on the analysis. If no action is determined, the process 2000 returns to step 2002.

If an action is determined, the process 2000 moves to step 2010, where a message is sent to the user associated with the network 200. In an embodiment, the user is contacted via one or more of text message, social media message, email, telephone call, voice mail, and the like. In an embodiment, sending a message to the user is optional. In an embodiment, the message requests confirmation from the user before the action is taken. In another embodiment, the message is sent to the user to report the action after the action is taken.

At step 2012, the cloud server 130 sends a message to the network controller 250 and the network controller 250 sends the message to the device on the network 200 to control the device. In an embodiment, the message comprises a command, which is received and acted upon by the device.

Examples of Cloud Server Adaptive Learning

For example, a home-control network 200 may be set up such that outdoor lights illuminate at sunset, as determined by a solar calendar. However, the aggregated data for a mountainous geographic area indicates that lights are enabled on others' home-control networks 200 30-minutes earlier than sunset due the shadows cast by the mountains. The cloud server 130 may send the user a message suggesting that the lights illuminate 30 minutes ahead of the sunset or the cloud server 130 may send the lighting modules on the network 200 a command to enable earlier than sunset.

For example, the aggregated data over a plurality of home-control network 200 indicates that the majority of users run the lights at 80% of the full illumination to save on electricity costs. The cloud server sends the user a message asking if the user would like to change the illumination intensity of the lights on the user's home-control network 200.

For example, the aggregated data indicates that the neighbors set their thermostats to 78° C. and the network status indicates that the user sets his thermostat to 74° C. The cloud server 130 sends a message asking if the user would like to change the thermostat setting to 78° C.

For example, the users within a selected geographic area agree to offset the run times of their air conditioning units to avoid energy consumption spikes. The cloud server 130 receives the weather data and keeps track of when the HVAC units within the geographic area are enabled when the outside temperature is greater than 85° C., and automatically sends commands to the HVAC units on the networks 200 to interleave their run times.

For example, the cloud-server 130 receives weather data from the Internet, geo-location data from the homeowner's car via the Internet, and information from neighboring home-control networks 240. The cloud-server 130 analyzes the data which indicates that the temperature outside is predicted to drop below freezing in the next week, others in a similar location as the house have drained their water pipes, and the owner is far away. The cloud server 130 determines that the water sensor system should act to drain the water pipes in the house to prevent the water pipes from bursting.

Figure 3:
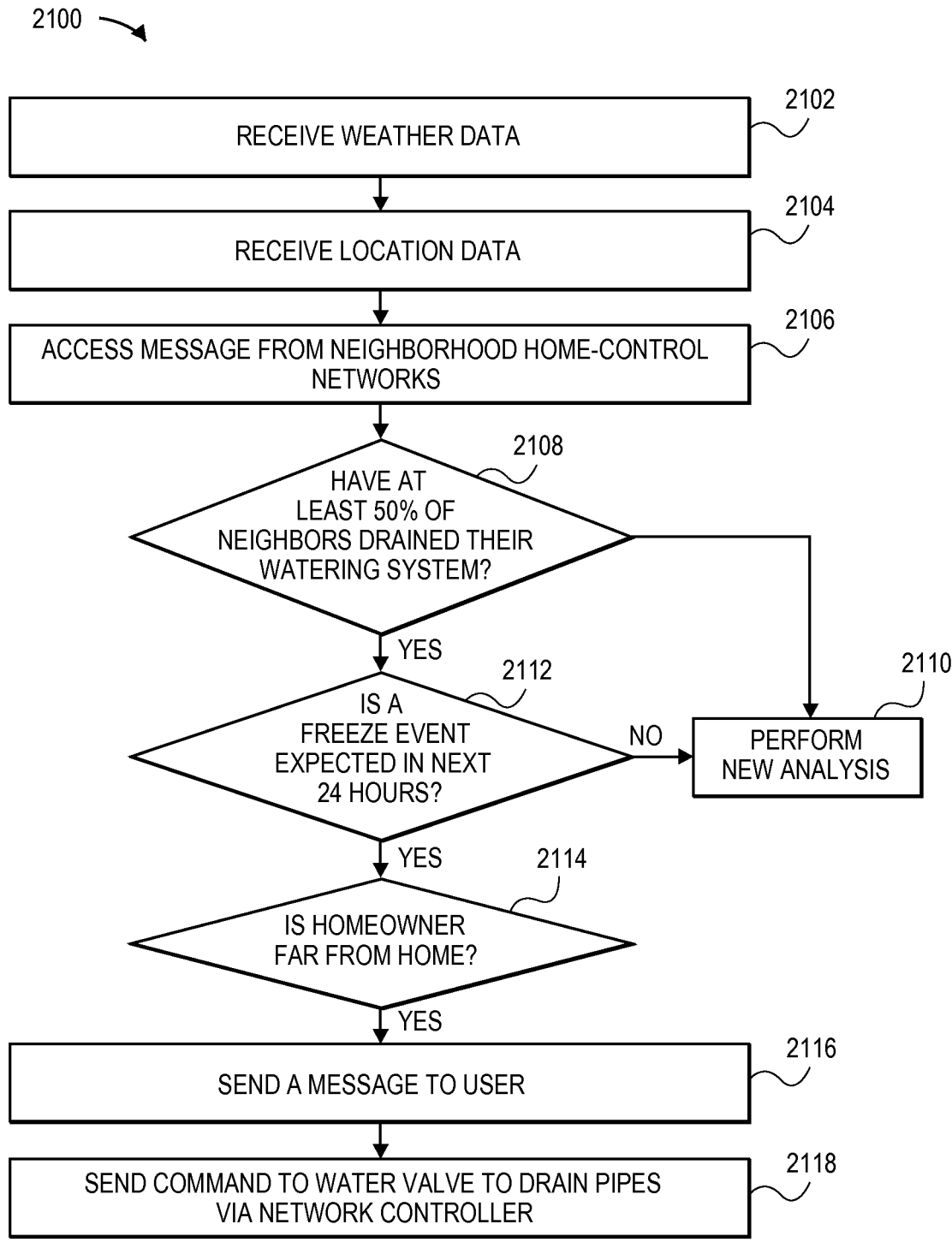
FIG. 3 illustrates a process for a cloud server to control a water sensor system on a home-control network, according to certain embodiments.

FIG. 3 illustrates an exemplary process 2100 for the cloud server 130 to control a water sensor system on the home-control network 200. In an embodiment, the water sensor system comprises at least one water valve that can be opened and closed by the home-control network 200. Beginning at step 2102, the cloud server 130 receives weather data. In an embodiment, the cloud server 130 accesses the Internet to acquire the weather data.

At step 2104, the cloud server 130 accesses location data associated with the user. In an embodiment, the cloud server 130 accesses a geo-location application associated with the user's car.

At step 2106, the cloud server 130 accesses network messages from neighboring home-control networks 200.

In steps 2108-2114, the cloud server 130 analyzes the weather data, the location data, and the neighbors' network data. At step 2108, the cloud server 130 determines whether a predetermined percentage of neighbors have drained their watering system, based at least in part on the aggregated message data. In an embodiment, the predetermined percentage is 50%. In other embodiments, the predetermined percentage is greater than 50% or less than 50%.

If the predetermined percentage of neighbors have drained their watering system, the process 2100 moves to step 2112, where the cloud server 130 determines if a freeze event is expected in the next 24 hours, based at least in part on the weather data. If the freeze event is expected, the process 2100 moves to step 2114, where the cloud server 130 determines whether the user is far from the user's home-control network 200, based at least in part on the location data.

If the user is far from his home-control network 200, the cloud server 130, at step 2116, informs the user that the outside watering system will be drained to prevent damage to the pipes and the cloud server 130 at step 2118 sends a command to the water valve on the user's home-control network 200 to open to drain the water from the pipes.

If any of the conditions do not occur, such as neighbors have not drained their watering systems, a freeze event is not expected, or the user is close to the user's home-control network 200, the cloud server 130 performs a different analysis or rule set at step 2110.

The above scenarios comprise examples of cloud server adaptive learning and are not limiting.

Network Controller Adaptive Learning

In an embodiment, the network controller 250 receives sensor information from the cloud server 130 and/or the network controller 250 could have its own sensors, such as a clock, calendar, or light sensor. The network controller 250 sends commands to the network device 220 based on the sensor information to implement learned behavior.

In another embodiment, the network controller 250 also receives from the cloud server 130 stimulus data, such as information from Facebook®, information from the user's smart phone, car, or work computer, traffic patterns, weather, or utility rates. The network controller 250 sends commands to the network device 220 based on the sensor information and stimulus data to implement learned behavior.

Figure 4:
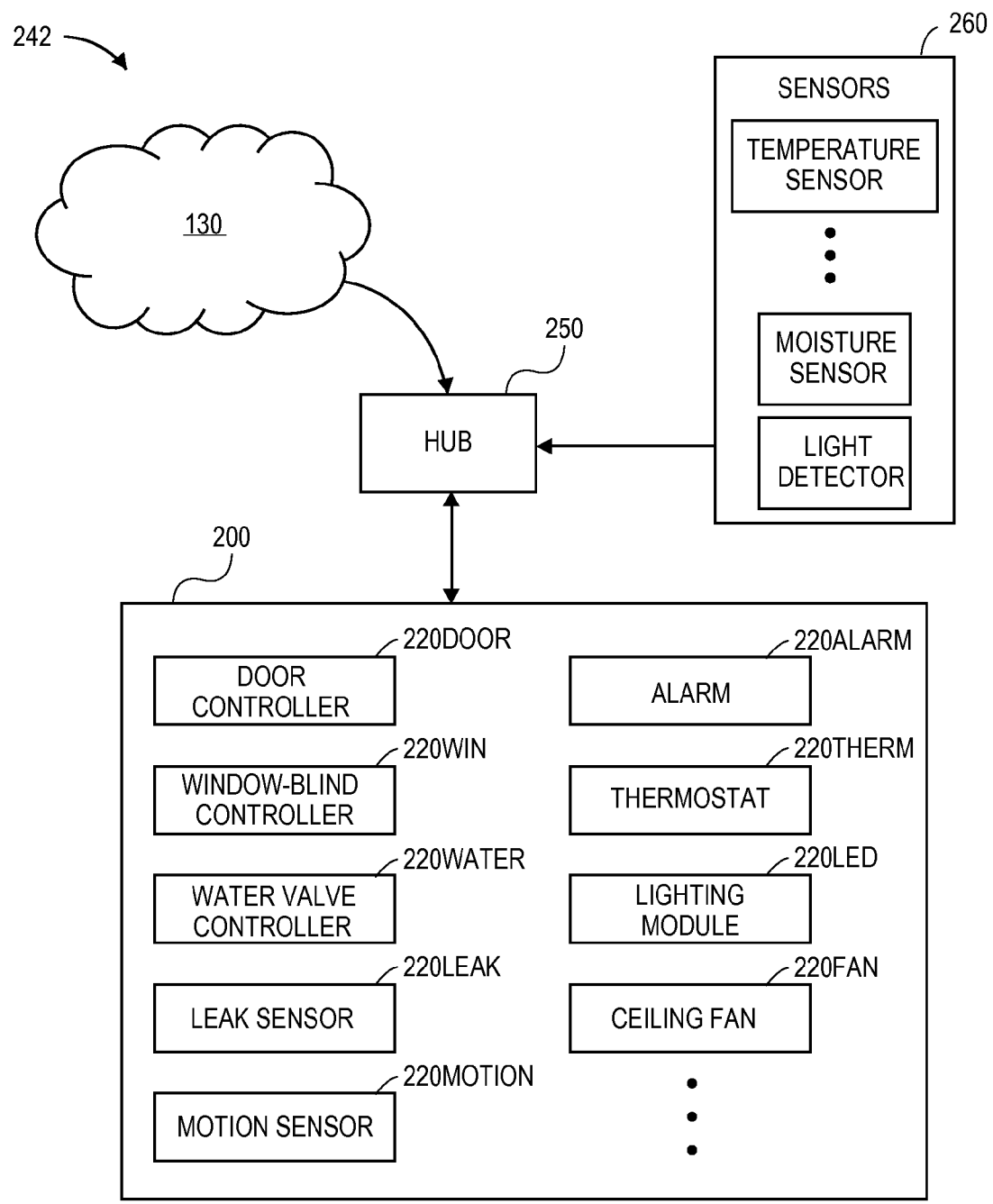
FIG. 4 is a block diagram of an adaptive learning system for a network controller, according to certain embodiments.

FIG. 4 illustrates an adaptive learning system 242 for the network controller 250. The network-controller adaptive learning system 242 comprises the network controller 250, a plurality of sensors 260 associated with the network controller 250 and configured to provide sensor data to the network controller 250, and the home-control network 200.

In the illustrated embodiment, the home-control network 200 comprises exemplary network devices 220, such as one or more of a door controller 220DOOR, a window-blind controller 220WIN, a water valve controller 220WATER, a leak sensor 220LEAK, a motion sensor 220MOTION, an alarm 220ALARM, a thermostat 220THERM, a lighting module 220LED, a ceiling fan 220FAN, and the like.

Typically, the network devices 220 are configured to operate a mechanical or electrical mechanism. For example, the door controller 220DOOR is configured to lock and unlock a door lock. The window blind controller 220WIN is configured to raise, lower, or tilt a window blind. The lighting module 220LED is configured to open and close a solid-state switch to provide or inhibit voltage and current to a lighting device.

The plurality of sensors 260 are configured to provide sensor data to the network controller 250. In an embodiment, the sensors 260 provide sensor data to a sensor input of the network controller 250, independent from the message data on the network 200. Examples of sensors 260 are one or more of a temperature sensor, a motion sensor, a light detector, a soil moisture sensor, a rain gauge, a snow gauge, a gas sensor, a flow meter, a wind meter, and the like.

In an embodiment, the adaptive learning system 242 further comprises the cloud server 130 and the network controller 250 is configured to receive cloud sensor data from the cloud server 130.

Figure 5:
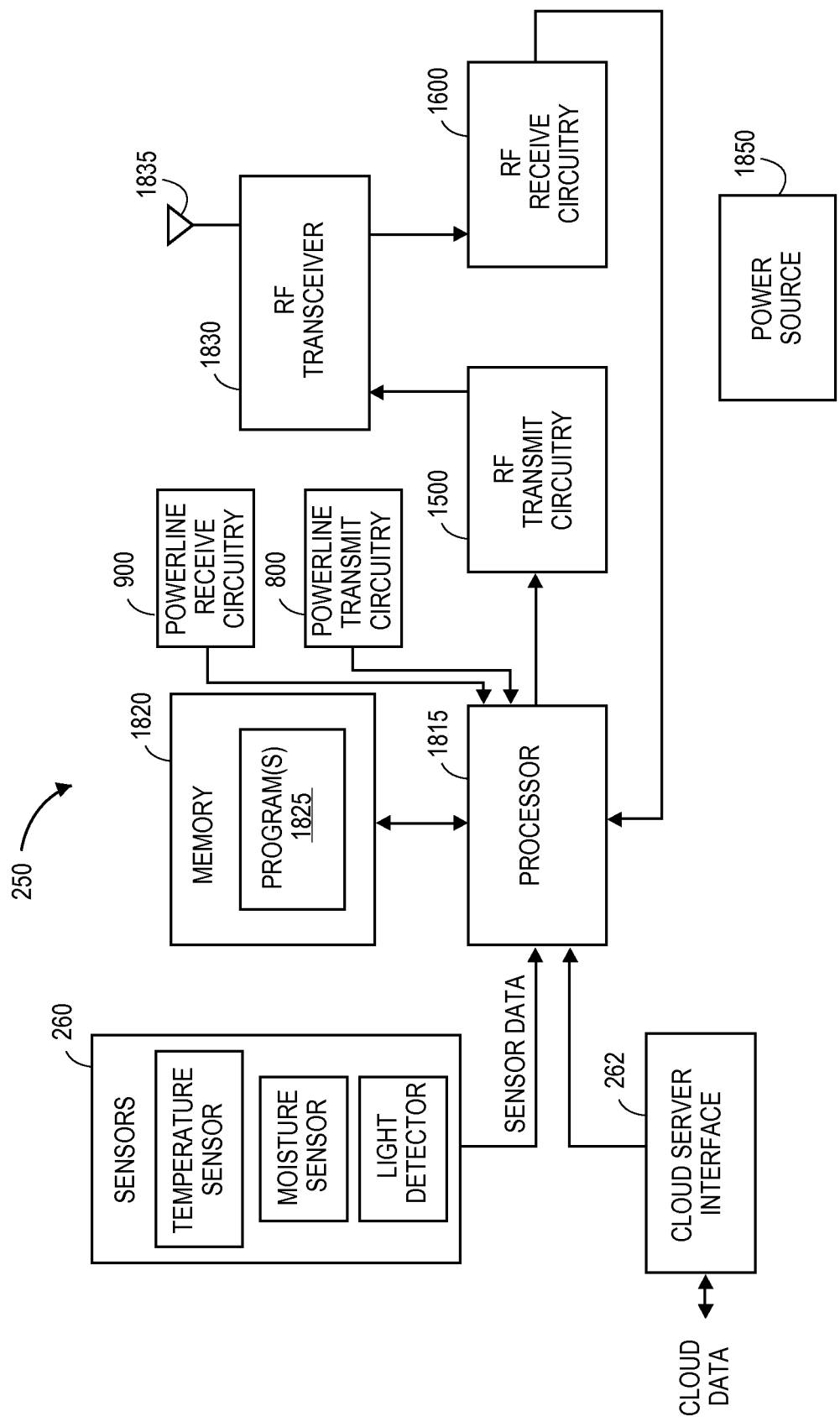
FIG. 5 is a block diagram illustrating a network controller, according to certain embodiments.

FIG. 5 illustrates an embodiment of the network controller 250 comprising processor circuitry, messaging circuitry, a power source 1850, and a cloud server interface 262. The processor circuitry comprises a processor 1815 and memory 1820 further comprising program, program logic, or rule sets 1825 directed toward adaptive learning algorithms for the network controller 250. The messaging circuitry comprises powerline receive circuitry 900, powerline transmit circuitry 800, RF transmit circuitry 1500, RF receive circuitry 1600, a RF transceiver 1830, and an antenna 1835.

The processor 1815 provides program logic and memory 1820 in support of programs 1825 and intelligence within the network controller 250. In an embodiment, the processor 1815 comprises a computer and the associated memory 1820. The computers comprise, by way of example, processors, program logic, or other substrate configurations representing data and instructions, which operate as described herein. In other embodiments, the processors can comprise controller circuitry, processor circuitry, processors, general-purpose single-chip or multi-chip microprocessors, digital signal processors, embedded microprocessors, microcontrollers and the like.

The memory 1820 can comprise one or more logical and/or physical data storage systems for storing data and applications used by the processor 1815 and the program logic 1825. The program logic 1825 may advantageously be implemented as one or more modules. The modules may advantageously be configured to execute on one or more processors. The modules may comprise, but are not limited to, any of the following: software or hardware components such as software object-oriented software components, class components and task components, processes methods, functions, attributes, procedures, subroutines, segments of program code, drivers, firmware, microcode, circuitry, data, databases, data structures, tables, arrays, or variables.

In an embodiment, the processor 1815 executes the programs or rule sets 1825 stored in the memory 1820 to process cloud data, sensor data, and network messages. The processor 1815 receives sensor data from at least one of the sensors 260 and cloud data from the cloud server 130 via the cloud server interface 262. The processor 1815 receives data and/or commands from messages received from one or more of network devices 220, a user through an intelligent device, and the cloud server 130. Further, the processor 1815 composes messages to one or more of the user through the intelligent device, the user computer, the cloud server 130, and the network devices 220, where the messages are based at least in part on at least one of the sensor data, the cloud data, and the decoded messages.

The network controller 250 is further configured to transmit and receive messages via the network 200 using one or more of radio frequency (RF) communications and power-line communications.

In an embodiment, the processor 1815 sends the message to the RF transmit circuitry 1500, where the message is encoded using FSK, for example, onto a baseband signal, which is up converted and transmitted from antenna 1835 to other devices 220, 250 on the network 200. The operation of the RF transmit circuitry 1500 is described in further detail below with respect to FIG. 30.

In addition, the antenna 1835 receives RF signals from at least one network device 220 on the network 200, which are down converted to a baseband FSK encoded signal and decoded by the RF receive circuitry 1600. The operation of the RF receive circuitry 1600 is described in further detail below with respect to FIG. 31. In an embodiment, the FM carrier is approximately 915 MHz.

Network messages are sent over the powerline by modulating the data onto a carrier signal, which is added to the powerline signal. In an embodiment, the carrier signal is approximately 131.65 kHz. In an embodiment, the processor 1815 sends messages to the powerline transmit circuitry 800 for transmission over the network 200 via the powerline and receives data and/or commands from the network devices 220 via the powerline from the powerline receive circuitry 900. The overall flow of information related to sending and receiving messages over the network 200 via the powerline is described in further detail below with respect to FIG. 22. The operation of the powerline transmit circuitry 800 is described in further detail below with respect to FIG. 23 and the operation of the powerline receive circuitry 900 is described in further detail below with respect to FIG. 24.

In an embodiment, the power source 1850 comprises the powerline, an AC/DC converter, and a regulator to convert and regulate the powerline voltage to approximately 5 volts to power the circuitry 262, 800, 900, 1500, 1600, 1815, 1820, and 1830. In another embodiment, the power source 1850 comprises a battery and a regulator to regulate the battery voltage to approximately 5 volts to power the circuitry 262, 800, 900, 1500, 1600, 1815, 1820, and 1830. Embodiments of the battery can be rechargeable or disposable. In other embodiments, the power source 1850 comprises other voltage sources, AC/DC converters, photovoltaic cells, electro-mechanical batteries, standard on-time use batteries, and the like.

Figure 6:
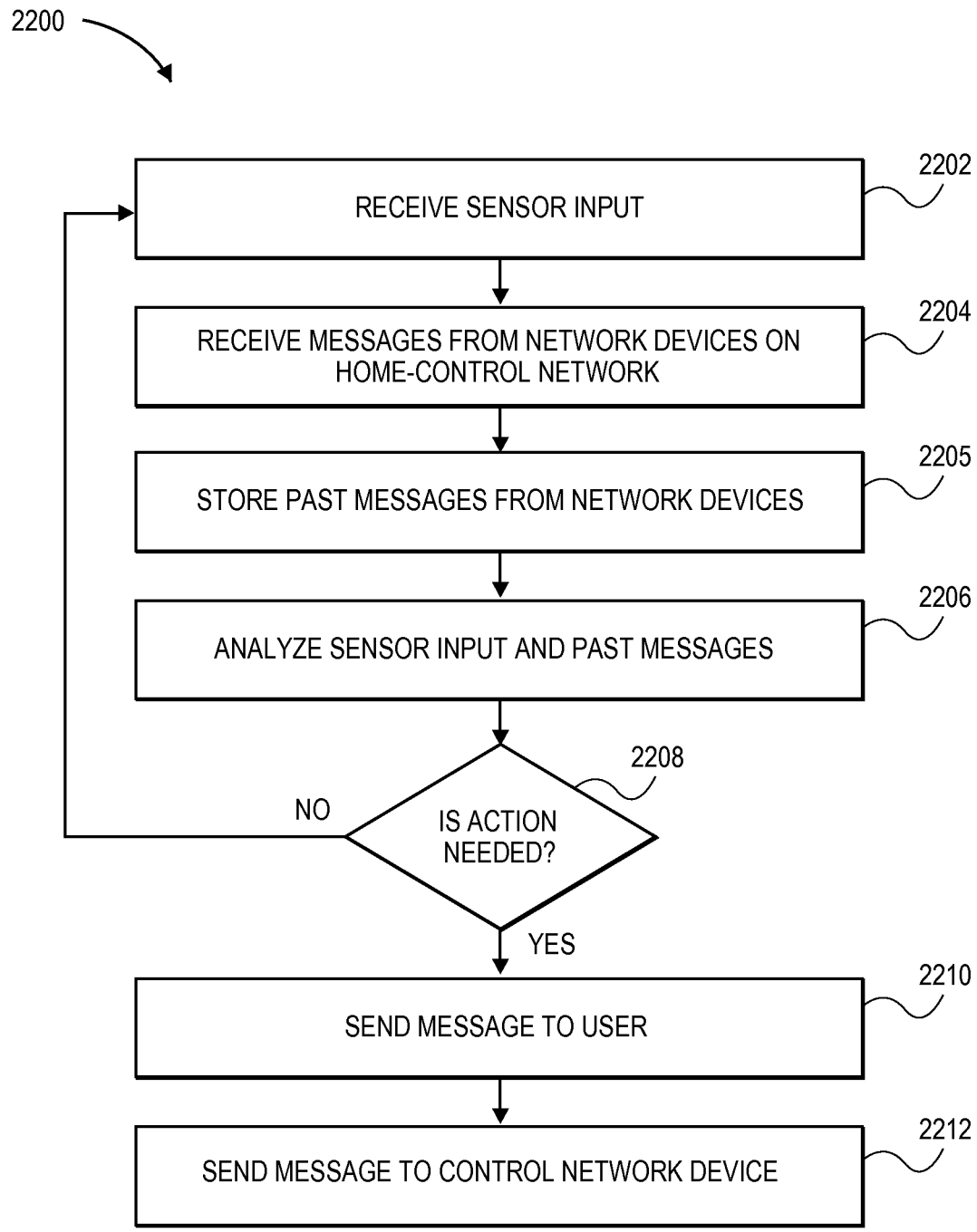
FIG. 6 illustrates an adaptive learning process for a network controller, according to certain embodiments.

FIG. 6 illustrates an adaptive learning process 2200 for the network controller 250. Beginning at step 2202, the network controller 250 receives data from one or more of the sensors 260. At step 2204, the network controller 250 receives and decodes the messages from the network devices 220 on the network 200.

At step 2205, the network controller stores at least one of the received and decoded messages from the network devices 220 on the network 200. The stored messages comprise past messages.

At step 2206, the network controller 250 analyzes the sensor data and the past messages. In another embodiment, the network controller 250 analyzes at least one of the sensor data, the past messages, and the cloud data. In an embodiment, the network controller 250 determines repetitive patterns, user patterns, historical patterns from one or more of the past messages. In an embodiment, the network controller 250 determines repetitive patterns, user patterns, historical patterns from one or more of the past messages in view of the sensor data and/or the cloud data. For example, the analyzed data could indicate that the user activates the network device 250 when a specific temperature or temperature range is reached, at a specific time of day, when another network device 250 attains a state or condition, or the like.

At step 2208, the network controller 250 determines whether to take an action to control a device on the network 200 based at least in part on the analysis. In an embodiment, the analysis comprises an adaptive learning process based at least in part on one or more of the sensor data, the past messages, and the cloud data. In another embodiment, based at least on the past message data, a past or historical user input to one network device 250 can be used to control another network device 250 on the home-control network 200. If no action is determined, the process 2200 returns to step 2202.

If an action is determined, the process 2200 moves to step 2210, where a message is sent to the user associated with the network 200. In an embodiment, the user is contacted via one or more of text message, social media message, email, telephone call, voice mail, and the like. In an embodiment, sending a message to the user is optional. In an embodiment, the message requests confirmation from the user before the action is taken. In another embodiment, the message is sent to the user after the action is taken to report the action.

At step 2212, the network controller 250 sends the message to the network device 220 on the network 200 to control the network device 220. In an embodiment, the message comprises a command, which is received and acted upon by the network device 220.

In an embodiment, the network controller 250 receives user actions performed on the local network 200 and continuously aggregates the network device actions. From the aggregate of the device actions, the network controller 250 creates snapshot behaviors and continuously updates the snapshots. Also, from the aggregate of the actions, the network controller 250 creates learned sequences and continuously updates the sequences.

Examples of Network Controller Adaptive Learning

For example, if aggregate actions indicate that the hot tub heater is set to 100° C. fifteen minutes after the front door opens on sunny weekday afternoons, then the network controller 250 can send commands to the hot tub heater to turn on and set the water temperature to 100° C. when the weather is sunny, it is a weekday, and the user's smartphone is within a specified geo-fencing ring. In addition, the network controller 250 can implement load-shedding behavior based on utility rates or a user set sliding scale between comfort and economy.

In a further embodiment, the network controller 250 receives the outside temperature from the temperature sensor 260 and determines that due to the outside air temperature, it will take longer to heat the hot tub to 100° C. The network controller 250 considers the additional heating time and sends commands to the hot-tub heater to turn on when the user's smartphone is within a different geo-fencing ring.

For example, the network controller 250 receives messages from the thermostat 220THERM, the temperature sensor 260, and the leak detector 220LEAK indicating that the house temperature setting is 35° C., the outside temperature is 27° C. and dropping, but no leaks are detected. The network controller 250 analyzes the sensor and device data and determines that the pipes are in danger of freezing and bursting.

For example, the network controller 250 receives messages from the alarm system 220ALARM, and the door lock controller 220DOOR, in addition to the thermostat 220THERM, the leak detector 220LEAK, and the temperature sensor 260. The alarm system 220ALARM and the door lock controller 220DOOR indicate that the alarm is set and the door is locked. The network controller 250 analyzes the sensor and device data and determines that the pipes are in danger of freezing and bursting, and that the homeowner has left. The network controller 250 notifies the homeowner that the home-control network 200 will drain the pipes within 2 hours unless the homeowner instructs otherwise. The network controller 250 may actively send a message to the homeowner via email, text message, or voice mail, or may passively update the status of the home-control network 250.

Figure 7:
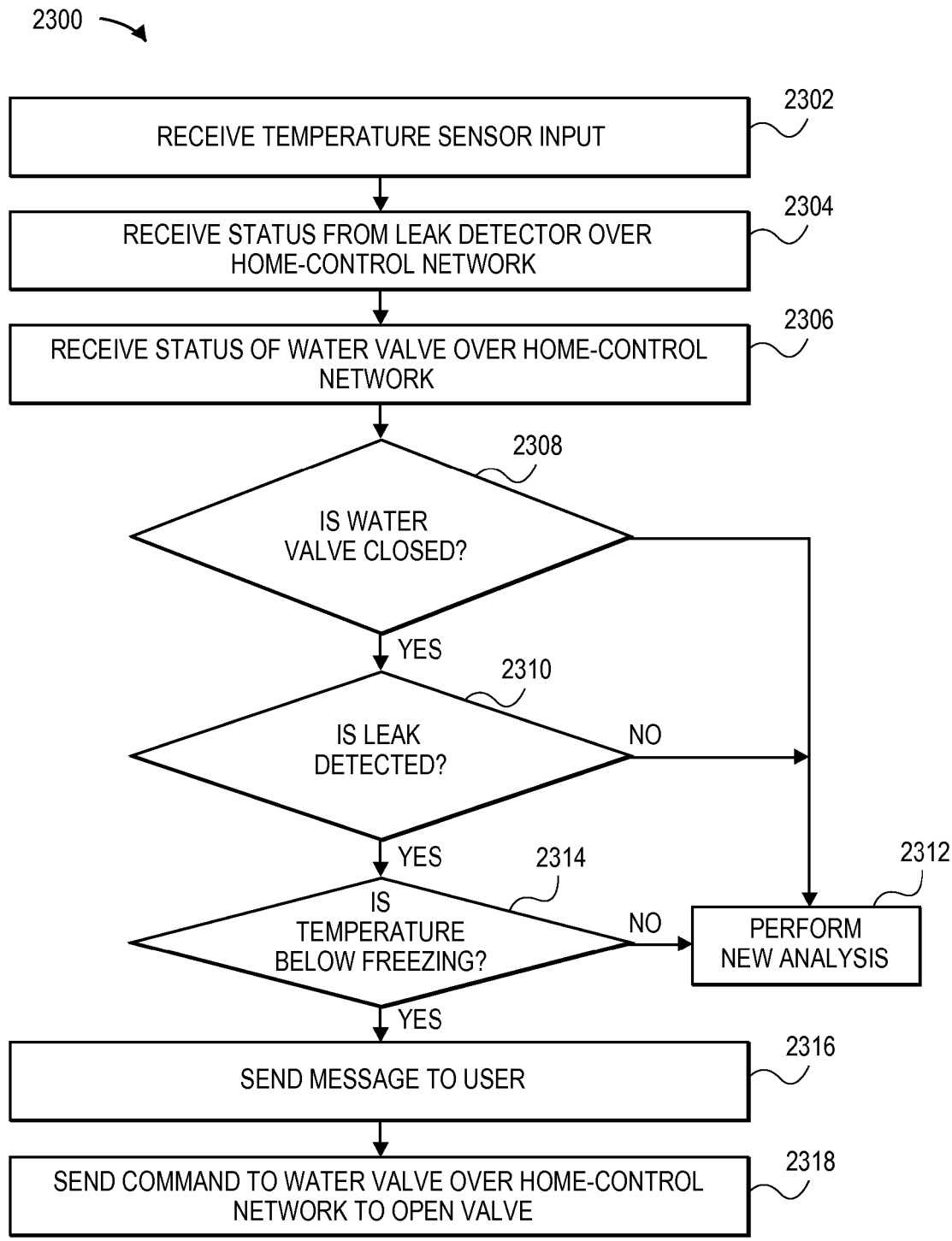
FIG. 7 illustrates a process for a network controller to control a water sensor system on a home-control network, according to certain embodiments.

FIG. 7 illustrates a process 2300 for the network controller 250 to control a water valve on the home-control network 200. Beginning at step 2302, the network controller 250 receives temperature data from the temperature sensor 260. At step 2304, the network controller 250 receives a message comprising the status of the leak sensor 220LEAK over the home-control network 200. At step 2306, the network controller 250 receives a message comprising the status of the water valve from the water valve controller 220WATER over the home-control network 220.

At step 2308, the network controller 250 determines whether the water valve is open, based at least in part on the received water valve status from the water valve controller 220WATER. If the water valve is open, the process 2300 moves to step 2310, where the network controller 250 determines whether a leak is detected based at least in part on the status of the leak detector 220LEAK.

If a leak is detected, the process moves to step 2314, where the network controller 250 determines whether the temperature is below freezing based at least in part on the received temperature sensor data. If the temperature is below freezing, the process moves to step 2316.

At step 2316, the network controller 250 sends a message to the user associated with the network 200. In an embodiment, the user is contacted via one or more of text message, social media message, email, telephone call, voice mail, and the like. In an embodiment, sending a message to the user is optional. In an embodiment, the message requests confirmation from the user before the action is taken. In another embodiment, the message is sent to the user to report the action after the action is taken.

At step 2318, the network controller 250 sends the message to the water valve controller 220WATER on the network 200 to open the water valve, such that the water pipes drain and are prevented from freezing and bursting. In an embodiment, the message comprises a command, which is received and acted upon by the water valve controller 220WATER.

If any of the conditions do not occur, such as the water valve is already open, a leak is not detected, and the temperature is above freezing, the network controller 250 performs a different analysis or rule set at step 2312.

The above scenarios comprise examples of network controller adaptive learning and are not limiting.

Network Device Adaptive Learning

Typically, the network devices 220 are configured to perform an operation that affects the state of a mechanism. These operations can also be performed by the user. For example, the door lock controller 220DOOR locks and unlocks a door and the thermostat 220THERM sets the temperature on the thermostat. The user can override the action of the network device 220. For example, the user can manually unlock a door recently locked by the door controller 220DOOR and the user can manually set the thermostat to a desired temperature, overriding any temperature commands received by the thermostat 220THERM.

In an embodiment, the network device 220 on the home-control network 200 receives inputs from sensors and physical actions from the user and determines whether to change the state of the operational mechanism associated with the network device 220.

In an embodiment, the network device 220 receives user actions performed on the network device 220 and continuously aggregates the network device's actions. From the aggregate of the device actions, the network device 220 creates snapshot behaviors and continuously updates the snapshots. Also, from the aggregate of the actions, the network device 220 creates learned sequences and continuously updates the sequences.

Figure 8:
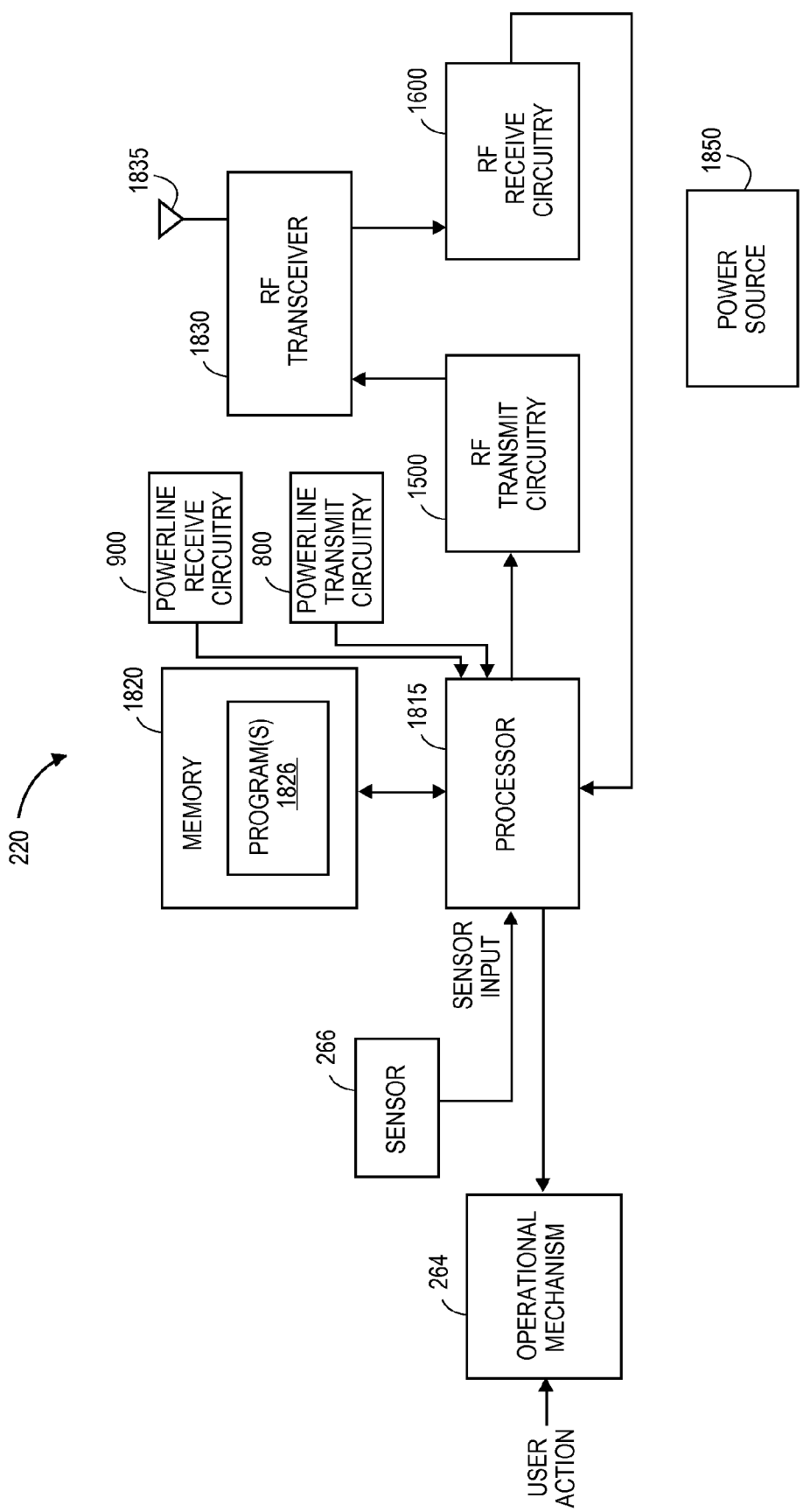
FIG. 8 is a block diagram of a network device, according to certain embodiments.

FIG. 8 is an embodiment of an adaptive learning system for the network device comprising the network device 220 and one or more sensors 266 associated with the network device 220. The network device 220 comprises processor circuitry, messaging circuitry, the power source 1850, and an operational mechanism 264. The processor circuitry comprises the processor 1815 and memory 1820 further comprising program, program logic, or rule sets 1826 directed toward adaptive learning algorithms for the network device 220.

The processor 1815 provides program logic and memory 1820 in support of programs 1826 and intelligence within the network device 220. The memory 1820 can comprise one or more logical and/or physical data storage systems for storing data and applications used by the processor 1815 and the program logic 1826. The program logic 1826 may advantageously be implemented as one or more modules. The modules may advantageously be configured to execute on one or more processors. The modules may comprise, but are not limited to, any of the following: software or hardware components such as software object-oriented software components, class components and task components, processes methods, functions, attributes, procedures, subroutines, segments of program code, drivers, firmware, microcode, circuitry, data, databases, data structures, tables, arrays, or variables.

In an embodiment, the processor 1815 executes the programs or rule sets 1826 stored in the memory 1820 to process sensor data, and user actions. In an embodiment, the user actions comprise aggregated user actions. The processor 1815 receives sensor data from at least one of the sensors 266. The processor 1815 receives data and/or commands from messages received from one or more of network devices 220 and the network controller 250. Further, the processor 1815 composes messages to one or more of the network devices 220 and the network controller 250, where the messages are based at least in part on at least one of the sensor data, and the user actions.

The network device 220 is further configured to transmit and receive messages via the network 200 using one or more of radio frequency (RF) communications and powerline communications. The messaging circuitry comprises the powerline receive circuitry 900, the powerline transmit circuitry 800, the RF transmit circuitry 1500, the RF receive circuitry 1600, the RF transceiver 1830, and the antenna 1835 as described with respect to FIGS. 17-32.

The sensors 266 are configured to provide sensor data to the network device 220. In an embodiment, the sensors 266 provide sensor data to a sensor input of the network device 220. Examples of sensors 266 are one or more of a temperature sensor, a motion sensor, a light detector, a soil moisture sensor, a rain gauges, a snow gauge, a gas sensor, a flow meter, a wind meter, and the like. In an embodiment, the network device 220 comprises the sensors 266.

The operational mechanism 264 comprises one or more of an electrical, mechanical, electro-mechanical solid-state actuator configured to change the state, perform an action, and the like, associated with the network device 220. For example, the operational mechanism 264 associated with the ceiling fan 220FAN comprises a solid-state switch configured to provide current and voltage to a motor of a ceiling fan.

Figure 9:
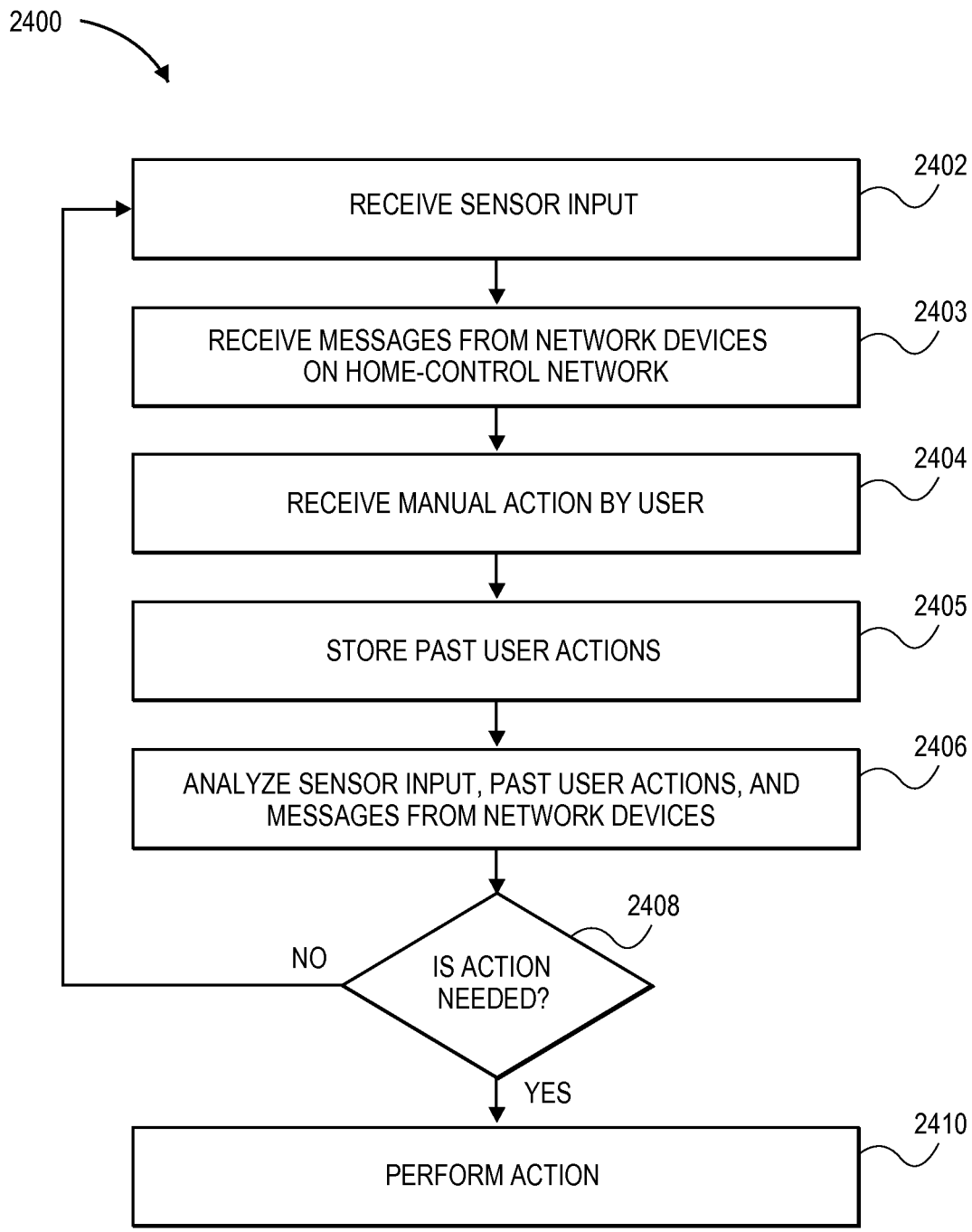
FIG. 9 illustrates an adaptive learning process for a network device, according to certain embodiments.

FIG. 9 illustrates an adaptive learning process 2400 for the network device 220. Beginning at step 2402, the network device 220 receives data from one or more of the sensors 266.

At step 2403, the network device 220 receives messages from network devices 250 on the home-control network 250. In an embodiment, the network device stores at least one of the received messages from the other network devices 250. The stored messages comprise past messages. In an embodiment, the network device 250 aggregates the past messages to determine repetitive patterns, historical patterns, user patterns, or the like.

At step 2404, the network device 220 receives manual actions performed by the user. In an embodiment, the network device 220 aggregates the user's actions. At step 2405, the network device 250 stores an indication of at least one of the manual actions by the user. The stored indications of the manual actions by the user comprise past user actions. In an embodiment, the network device 250 aggregates the past user actions to determine repetitive patterns, historical patterns, user patterns, or the like.

At step 2406, the network device 220 analyzes the sensor data and the past user actions. In another embodiment, the network device 220 analyzes at least one of the sensor data and the user's actions. In an embodiment, the network device 220 determines repetitive patterns, user patterns, historical patterns from the past user actions. In another embodiment, the network device 220 determines repetitive patterns, user patterns, historical patterns from one or more of the past user actions and the past messages, in view of the sensor data. For example, the analyzed data could indicate that the user activates the network device 250 when a specific temperature or temperature range is reached, at a specific time of day, when another network device 250 attains a state or condition, or the like.

At step 2408, the network device 220 determines whether to take an action based at least in part on the analysis. In an embodiment, the analysis comprises an adaptive learning process based at least in part on one or more of the sensor data, the past messages, and the past user actions. In another embodiment, based at least on the past message data, a past or historical user input to one network device 250 can be used to control another network device 250 on the home-control network 200. If no action is determined, the process 2400 returns to step 2402.

If an action is determined, the process 2400 moves to step 2410, where the network device 220 performs the action to the operational mechanism 266. In an embodiment, the network device 220 reports the action to the network controller 250, which may in turn report the action to the cloud server 130 and to the user via the cloud server 130.

Examples of Network Device Adaptive Learning

For example, a water valve controller 220WATER on the home-control network 200 receives sensor input and manual actions by the user and learns that Sunday evenings when the outside temperature is below 35° C., the water valve is manually closed. The water valve controller 220WATER determines based on past actions and input from a temperature sensor whether the valve should be automatically closed.

For example, in an embodiment where the leak sensor 220LEAK comprises a water valve, when the leak sensor 220LEAK detects a leak, the leak sensor 220LEAK closes the water valve.

For example, the water valve controller 220WATER on the home-control network 200 receives messages over the home-control network 200 from the leak detector 220LEAK and sensor input from a flow rate sensor. Once a leak is detected, the water valve controller 220WATER determines whether to shut the water valve immediately or to notify the user based at least in part on the flow rate sensor data.

Figure 10:
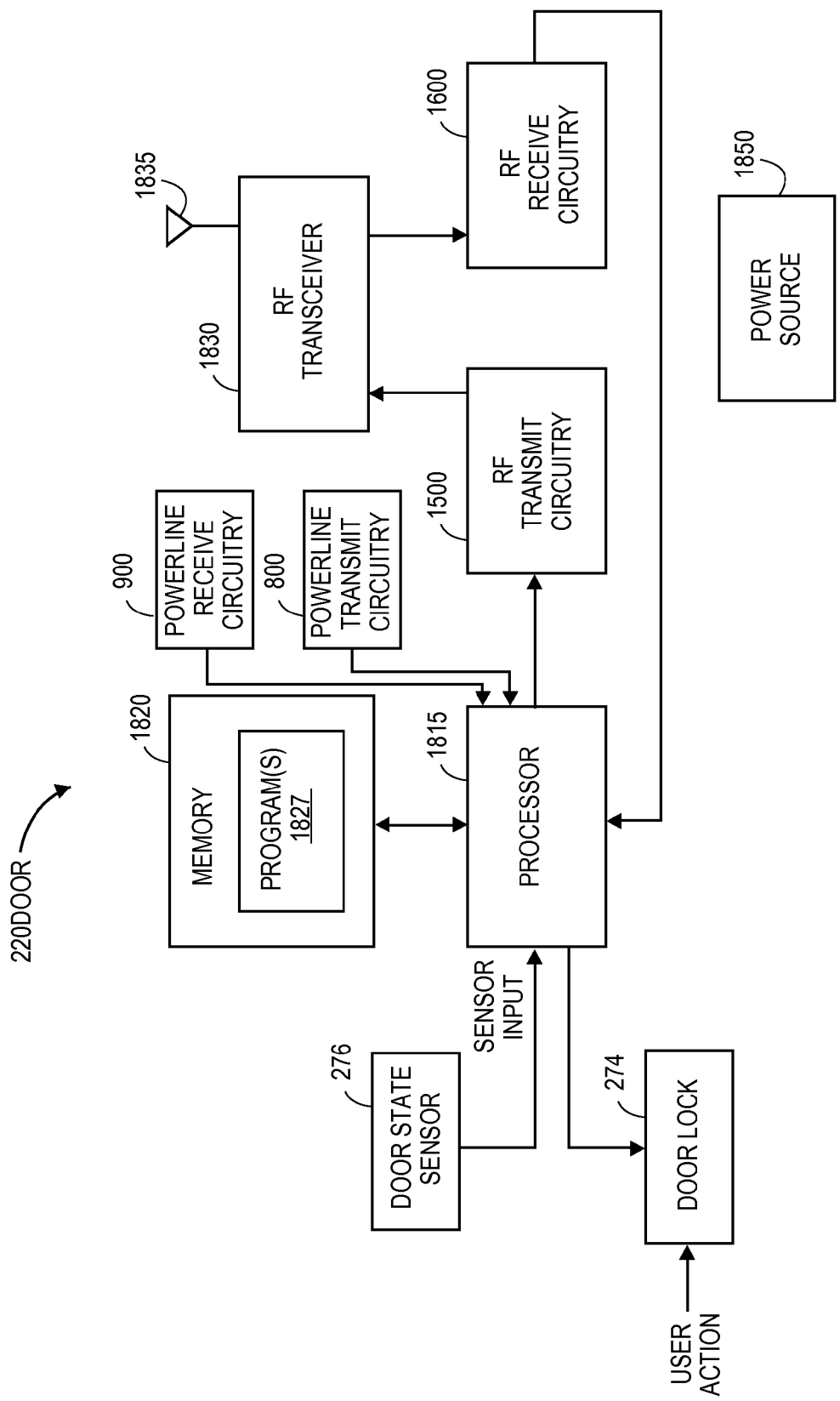
FIG. 10 is a block diagram of a door-lock controller on a home-control network, according to certain embodiments.
Figure 11:
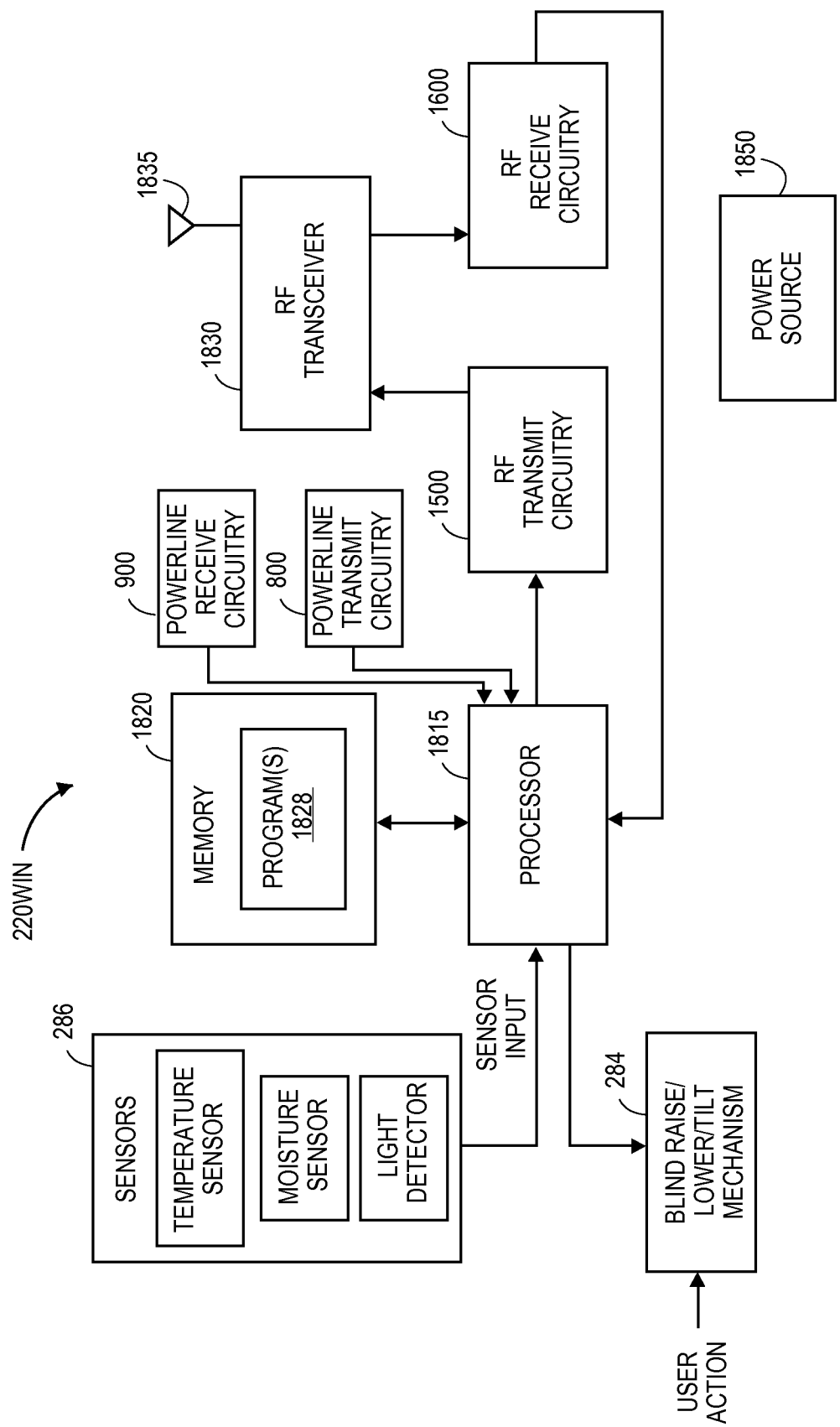
FIG. 11 is a block diagram of a window-blind controller on a home-control network, according to certain embodiments.
Figure 12:
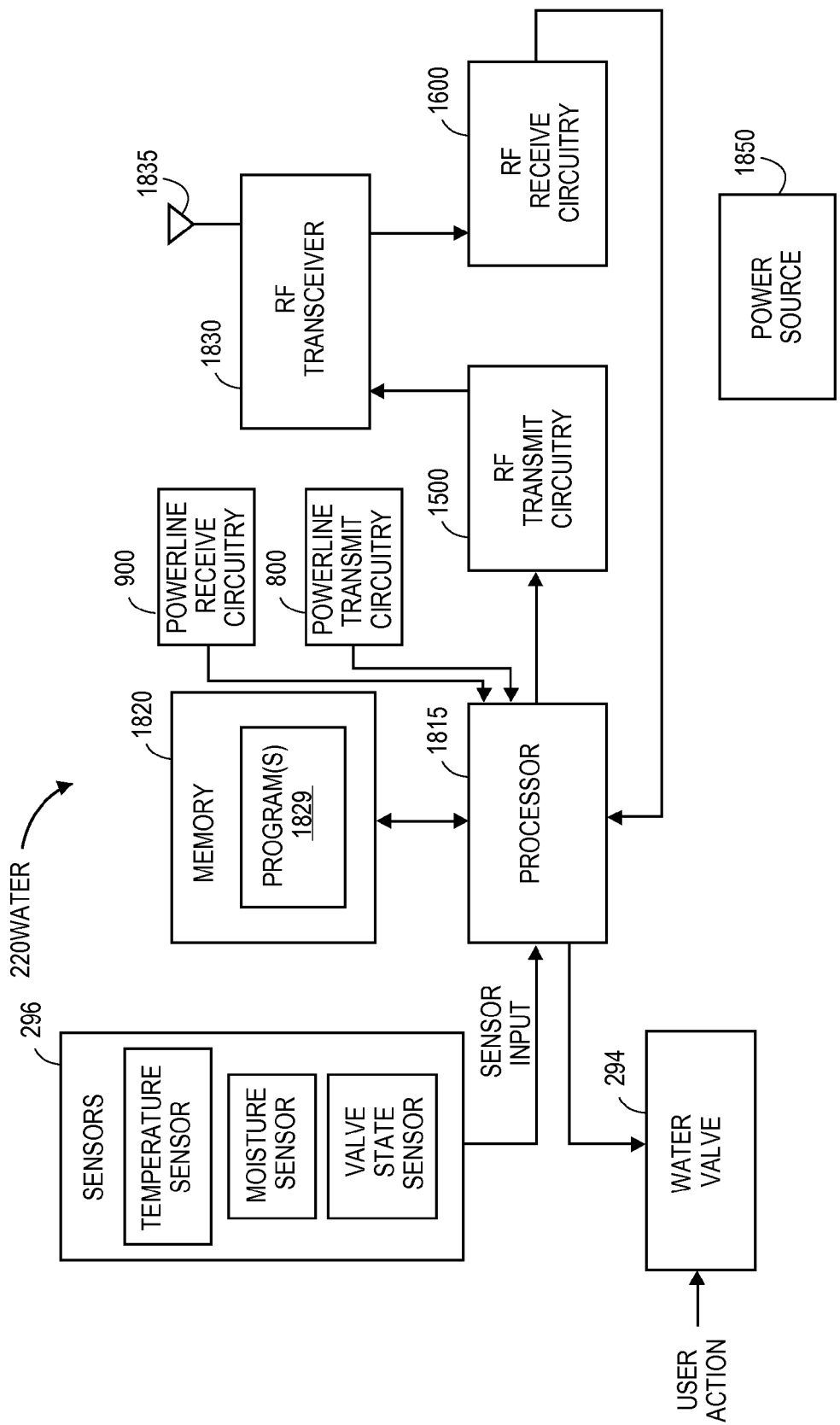
FIG. 12 is a block diagram of a water-valve controller on a home-control network, according to certain embodiments.

FIGS. 10-12 are embodiments of network devices 220 that are configured to receive sensor input, control an operational mechanism, and communicate over the home-control network 200 using RF and powerline signaling. FIG. 10 is an embodiment of the door-lock controller 220DOOR on the home-control network 200; FIG. 11 is an embodiment of the window-blind controller 220WIN on the home-control network 200; and FIG. 12 is an embodiment of the water-valve controller 220WATER on the home-control network 200.

The network devices 220DOOR, 220WIN, and 220WATER comprise processor circuitry, messaging circuitry, the power source 1850, and operational mechanisms 274, 284, 294, respectively. The processor circuitry comprises the processor 1815 and memory 1820. The messaging circuitry comprises the powerline receive circuitry 900, the powerline transmit circuitry 800, the RF transmit circuitry 1500, the RF receive circuitry 1600, the RF transceiver 1830, and the antenna 1835 as described with respect to FIGS. 17-32.

Referring to FIG. 10, the door lock controller 220DOOR further comprises programs, program logic, or rule sets 1827 directed toward adaptive learning algorithms for the door lock controller 220DOOR, where the processor 1815 provides program logic and memory 1820 in support of programs 1827 and intelligence within the door lock controller 220DOOR. In an embodiment, the processor 1815 executes the programs or rule sets 1827 stored in the memory 1820 to process sensor data, and user actions. The processor 1815 receives the sensor data indicating the locked or unlocked state of the door lock 274 from a door state sensor 276. In an embodiment, the door lock controller 220DOOR comprises the door state sensor 276. In an embodiment, the door lock controller 220DOOR comprises the door lock 274. Based at least in part on the door state sensor input and the user actions, the door lock controller 220DOOR determines whether the door lock 274 should be locked or unlocked.

Referring to FIG. 11, the window blind controller 220WIN further comprises programs, program logic, or rule sets 1828 directed toward adaptive learning algorithms for the window blind controller 220WIN, where the processor 1815 provides program logic and memory 1820 in support of programs 1828 and intelligence within the window blind controller 220WIN. In an embodiment, the processor 1815 executes the programs or rule sets 1828 stored in the memory 1820 to process sensor data, and user actions. The processor 1815 receives the sensor data indicating environmental conditions affecting the desired state of the window blind mechanism 284 from sensors 286. In an embodiment, the sensors 286 comprise a temperature sensor, a moisture sensor, and a light detector. In an embodiment, the window blind controller 220WIN comprises the sensors 286. In an embodiment, the window blind controller 220WIN comprises the window blind mechanism 284. Based at least in part on the sensor input and the user actions, the window blind controller 220WIN determines whether the window blind should be raised, lowered, or tilted.

Referring to FIG. 12, the water valve controller 220WATER further comprises programs, program logic, or rule sets 1829 directed toward adaptive learning algorithms for the water valve controller 220WATER, where the processor 1815 provides program logic and memory 1820 in support of programs 1829 and intelligence within the water valve controller 220WATER. In an embodiment, the processor 1815 executes the programs or rule sets 1829 stored in the memory 1820 to process sensor data, and user actions. The processor 1815 receives the sensor data indicating the state of a water valve 294 and environmental conditions that affect the desired state of the water valve 294 from sensors 296. In an embodiment, the sensors 296 comprise a temperature sensor, a moisture sensor, and a valve state sensor. In an embodiment, the water valve controller 220WATER comprises the sensors 296. In an embodiment, the water valve controller 220WATER comprises the water valve 294. Based at least in part on the sensor input and the user actions, the water valve controller 220WATER determines whether the water valve 294 should be opened, closed, or partially opened/closed.

Figure 13:
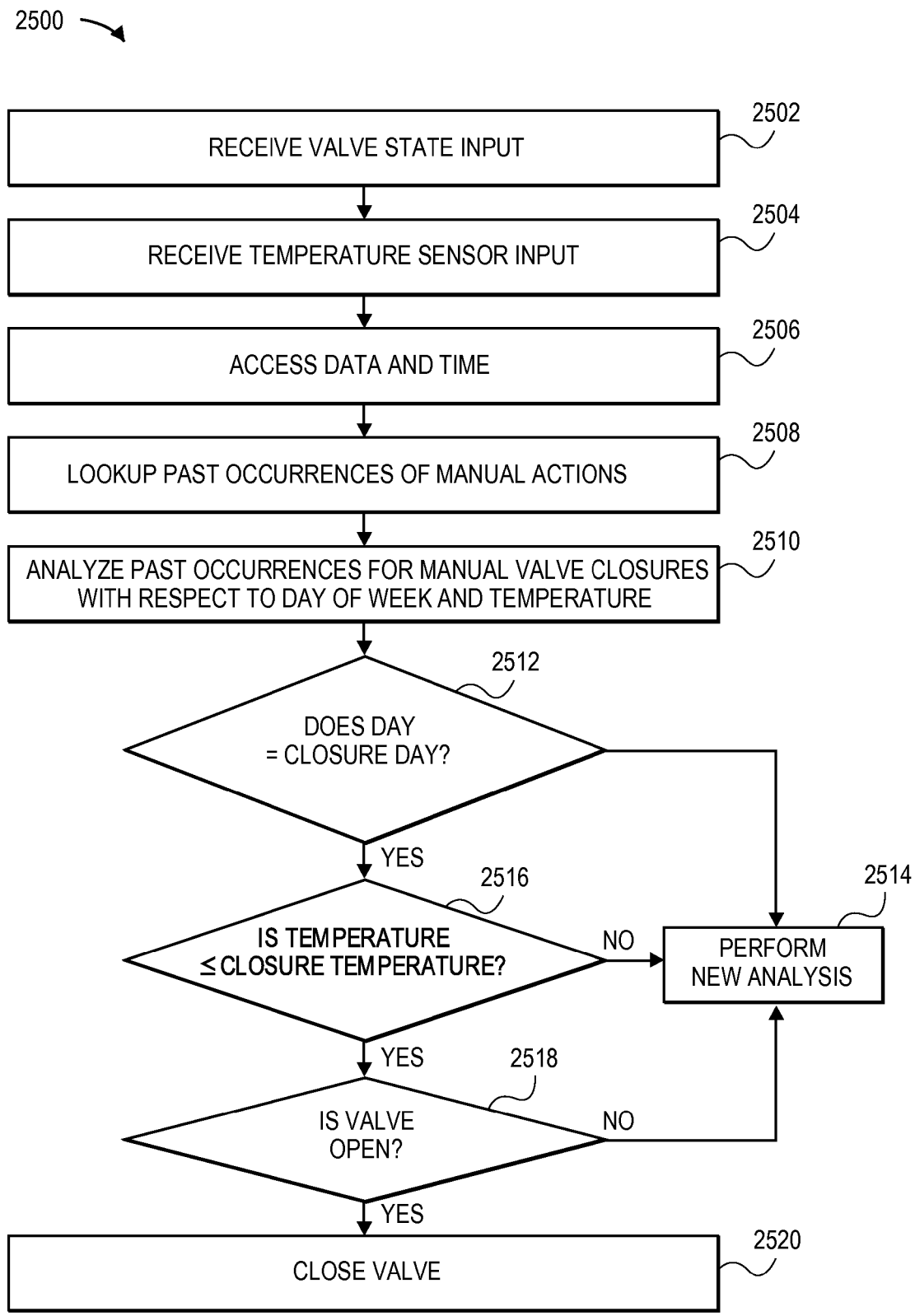
FIG. 13 illustrates a process for a water-valve controller on a home-control network to control a water valve, according to certain embodiments.

FIG. 13 illustrates a process 2500 for the water valve controller 220WATER on the home-control network 200 to control the water valve 294. Beginning at step 2502, the water valve controller 220WATER receives the state of the water valve 294 from the valve state sensor 296. At step 2504, the water valve controller 220WATER receives the temperature sensor input. At step 2506, the water valve controller 220WATER accesses the date and time from an internal calendar/clock running in the programming 1829. At step 2508, the water valve controller 220WATER looks up past occurrences of where the user manually opened or closed the water valve 294.

At step 2510, the water valve controller 220WATER analyzes the past occurrences with respect to day of the week and temperature. In an embodiment, the analysis determines repetitive patterns or historical patterns with respect the day of the week and temperature, for example.

At step 2512, the water valve controller 220WATER determines whether the current day from the internal calendar is the same as the day of the past water valve closures. If the current day is the same day as the past water valve closures, the process 2500 moves to step 2516.

At step 2516, the water valve controller 220WATER determines whether the current temperature from the temperature sensor 296 is the same as the temperature during past water valve closures. If the temperature is the same as the temperature from the past water valve closures, the process 2500 moves to step 2518, where the water valve controller 220WATER determines whether the water valve 294 is open based at least in part on the valve state sensor 296. If the water valve 294 is open, the process 2500 moves to step 2520, where the water valve controller 220WATER closes the water valve 294.

If any of the conditions do not occur, such as the water valve 294 is already closed, the temperature is not approximately the same as the manual valve closure temperature, and the day is not the same as the manual valve closure day, the water valve controller 220WATER performs a different analysis or rule set 1829 at step 2514.

User Communication System

Figure 14:
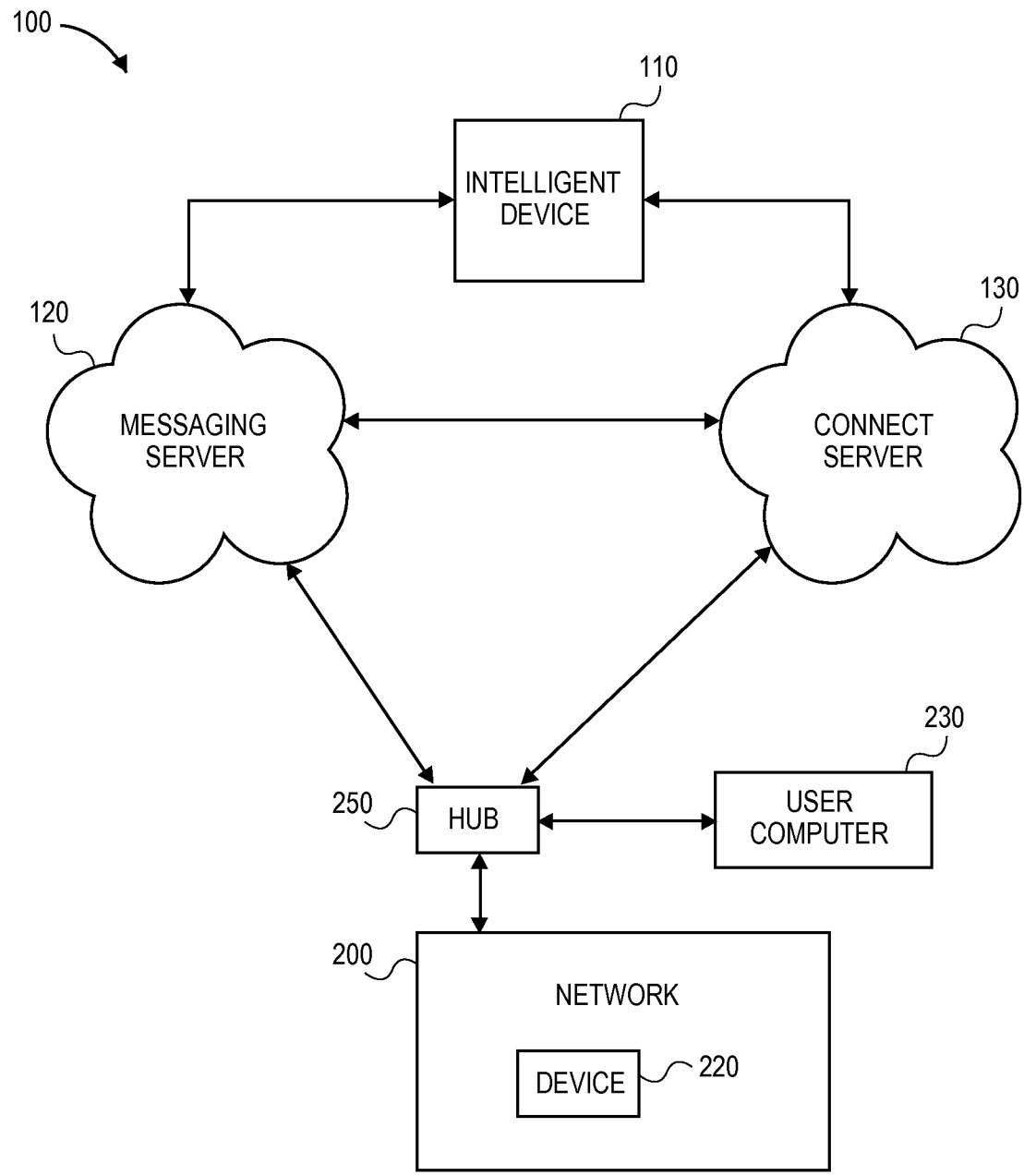
FIG. 14 is a block diagram illustrating a system to provide user communications to a home-control network, according to certain embodiments.

FIG. 14 is a block diagram illustrating a system 100 comprising a messaging server 120, the cloud server 130, and an intelligent device 110 to communicate with network devices 220 installed onto the communication network 200 via the network controller, intelligent controller, or hub 250. A user interfaces with the intelligent device 110, a user computer 230, or the like to communicate with the network controller 250, the network 200, and/or the network devices 220.

In another embodiment, the system 100 is used to securely install the network controller 250 onto the network 200 prior to communicating with the network devices 220.

During operation of the network 200, the network controller 250 is configured to transmit data and/or commands through the network 200 to network devices 220 and to receive through the network 200 messages from the network devices 220. The network controller 250 can further be configured to provide information to a user through one or more of the intelligent device 110 and the computer 230 and/or to receive user commands from the user through one or more of the intelligent device 110 and the user computer 230.

In an embodiment, the network 200 comprises a dual-band mesh area networking topology to communicate with devices 220 located within the network 200. The network devices 220 can comprise, for example, light switches, thermostats, motion sensors, and the like. In an embodiment, the network 200 comprises a home-control network. In another embodiment, the network 200 comprises an INSTEON® network utilizing an INSTEON® engine employing a powerline protocol and an RF protocol as is further described with respect to FIGS. 17-32.

Figure 15:
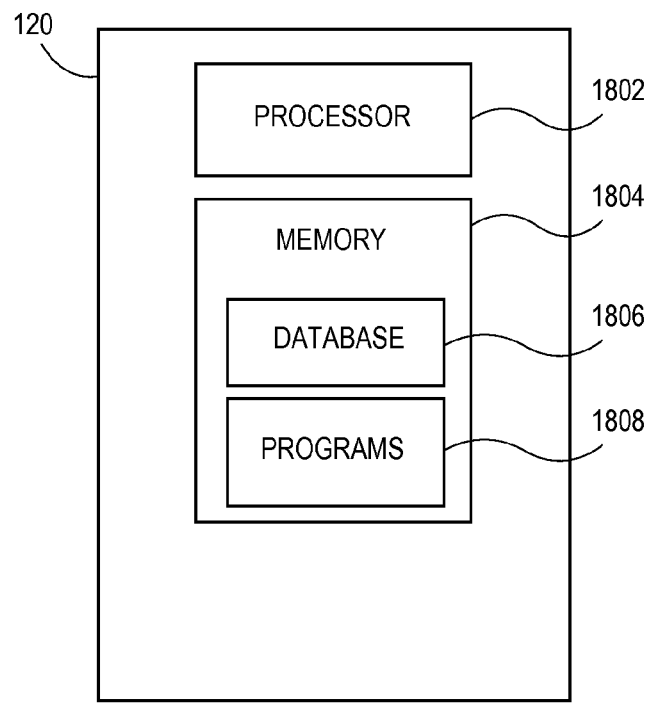
FIG. 15 is a block diagram illustrating a messaging server, according to certain embodiments.

Referring to FIG. 14, in an embodiment, the messaging server 120 communicates with the intelligent device 110, the cloud server 130, and the network controller 250. FIG. 15 illustrates a block diagram of the messaging server 120 comprising a processor 1802 and memory 1804. The memory 1804 comprises one or more databases 1806 and one or more programs 1808 where the processor 1802 is configured to access the databases 1806 and execute the programs 1808 to provide cloud-hosted messaging services.

The messaging server 120 is located in the cloud where it receives and transmits through a global network such as the Internet. In an embodiment, the messaging server 120 is at least a part of a cloud-hosted messaging service based on a standard messaging protocol that is configured to send and receive messages and provide computing services to host, manage, develop, and maintain applications. In another embodiment, the messaging service comprises the messaging server 120.

In an embodiment, the messaging server 120 utilizes a publish/subscribe protocol and presents messaging patterns where senders of messages, called publishers, do not program the messages to be sent directly to specific receivers, called subscribers. Instead, published messages are characterized into classes, without knowledge of what, if any, subscribers there may be. Similarly, subscribers express interest in one or more classes, and only receive messages that are of interest, without knowledge of what, if any, publishers there are. Thus, the messaging server 120 provides a communications platform that enables the network controller 250 to have a persistent connection between the network controller 250 and the cloud server 130. An example of a publish/subscribe messaging service is Pub-Nub™. Examples of other messaging services are, Amazon Web Services, Firebase, Frozen Mountain, Pusher, and the like.

Figure 16:
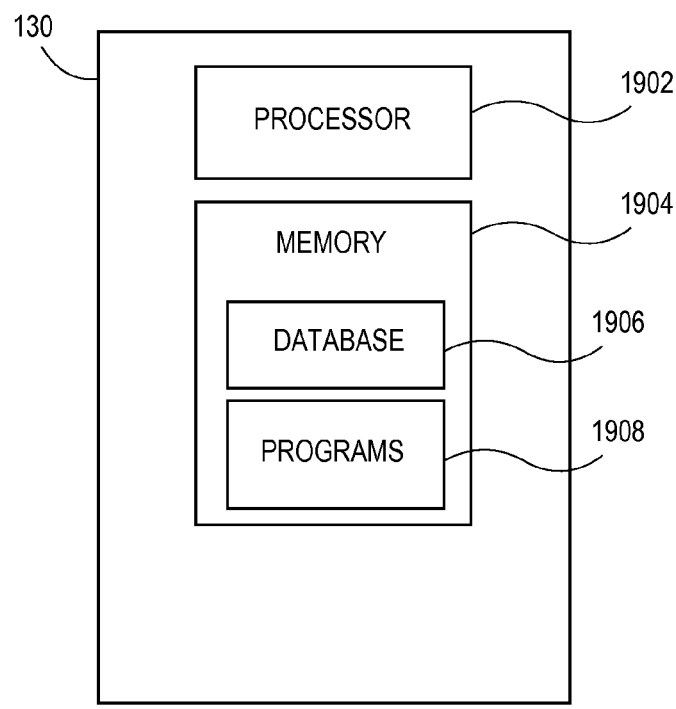
FIG. 16 is a block diagram illustrating a connect server, according to certain embodiments.

Referring to FIG. 14, In an embodiment, the cloud server 130 communicates with the intelligent device 110, the messaging server 120, and the network controller 250. FIG. 16 is a block diagram of the cloud server 130 comprising a processor 1902 and memory 1904. The memory 1904 comprises one or more databases 1906 and one or more programs 1908 where the processor 1902 is configured to access the databases 1906 and execute the programs 1908 to provide communication between the web-based applications 1908 and databases 1906 and the network controller 250. In an embodiment, the cloud server 130 communicates with a plurality of network controllers 250, where each of the network controllers 250 is associated with a network 200. The cloud server 130 communicates with the plurality of network controllers 250 through channels where the channels comprise one or more global channels that allow communications with more than one network controller 250 and sets of individual channels that allow the cloud server 130 to communicate with one network controller 250.

The cloud server 130 is located in the cloud where it receives and transmits through a global network such as the Internet. In an embodiment, the cloud server 130 is at least a part of a cloud-based home management service configured to provide communication between web-based applications and databases and the network controller 250. In an embodiment, the web-based applications run on the intelligent devices 110. In an embodiment, the Insteon® connect web services comprises the cloud server 130.

Referring to FIG. 14, the intelligent device 110 communicates with the messaging server 120 and the cloud server 130. The intelligent device 110 is remote from the network 200, or in other words, the intelligent device 110 is not part of the network 200. In an embodiment, the intelligent device 110 comprises a personal computer, a laptop, a notebook, a tablet, a smartphone, or the like, and interfaces with a user. In another embodiment, the intelligent device 110 comprises a user-operated device configured to operate with a client application and comprising a mobile operating system, such as, for example, Android, iOS, and the like, home automation desktop software, such as HouseLinc™ and the like, websites, or the like. In an embodiment, the intelligent device 110 runs an application that enables the user through the intelligent device 110 to send commands to the network controller 250 to control the devices 220 on the network 200 and to receive responses or status from the devices 220 via the network controller 250.

In the embodiment illustrated in FIG. 14, the network controller 250 is web-enabled and is configured to communicate with the messaging server 120 and the cloud server 130 over a global network, such as the Internet.

Further, the network controller 250, the cloud server 130, and the intelligent device are configured to communicate over private networks formed as a subset of the Internet through the messaging service and the messaging server 120. In an embodiment, the messaging server 120 provides a communication platform for communications between the cloud server 130 and the network controller 250 and a communication platform between the intelligent device 110 and the network controller 250.

The installation system 100 is configured to provide a secure and robust platform to communicate with the network controller 250. The messaging server 120 provides a communication platform that permits the network controller 250 to maintain a persistent connection to send and receive multiple requests/responses between the network controller 250, at least one intelligent device 110, and the cloud server 130.

Network

Figure 17:
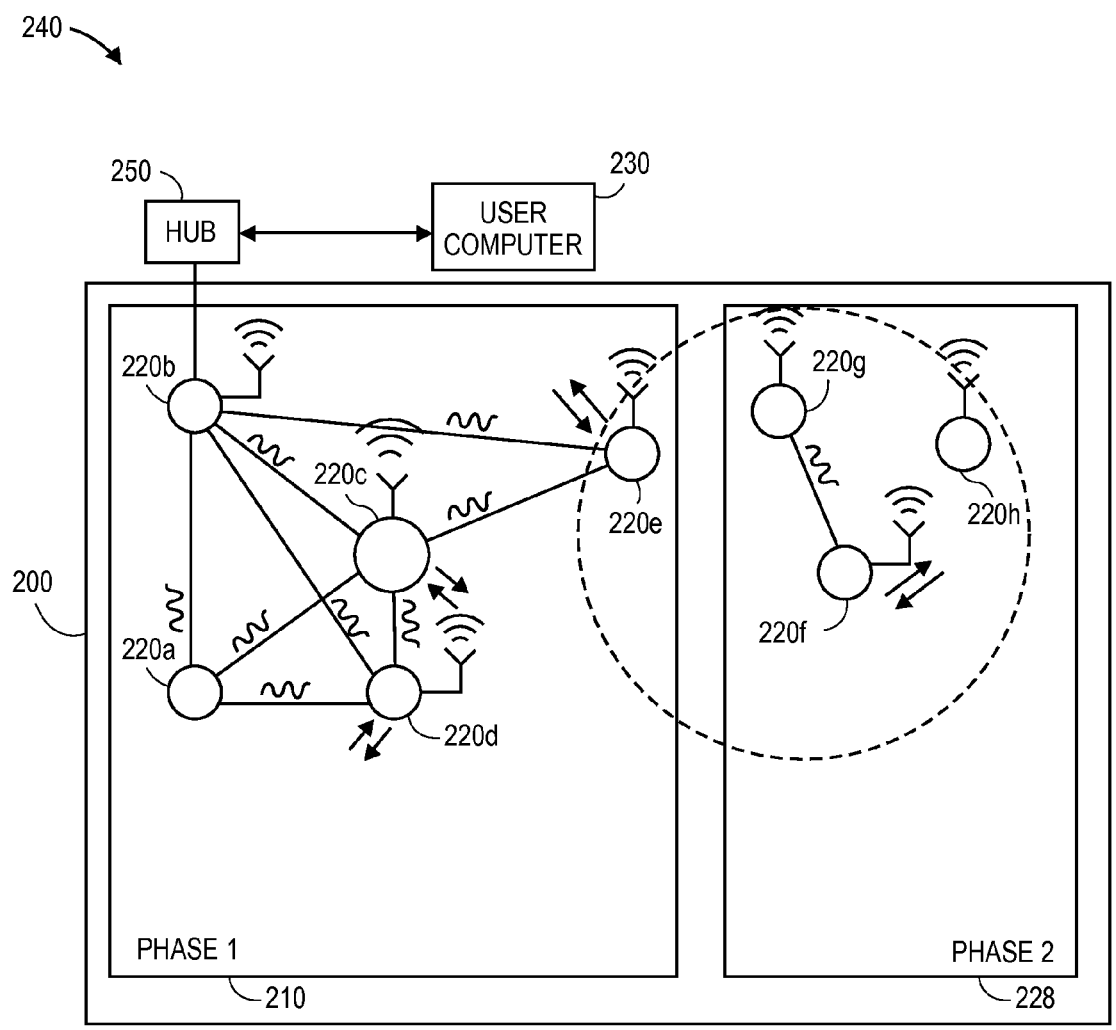
FIG. 17 is a block diagram of a powerline and radio frequency (RF) communication network, according to certain embodiments.

FIG. 17 illustrates an embodiment of the communication system 240 comprising the network 200, the network controller or hub 250, and the user computer 230. The communication system 240 is configured to propagate data and/or commands from the network controller or hub 250 to network devices 220 and to propagate messages from the network devises 220 to the network controller or hub 250.

In an embodiment, the network 200 comprises a dual-band mesh area networking topology to communicate with devices 220 located within the network 200. In an embodiment, the network 200 comprises an INSTEON® network utilizing an INSTEON® engine employing a powerline protocol and an RF protocol. The network devices 220 can comprise, for example, light switches, thermostats, motion sensors, and the like. INSTEON® devices are peers, meaning each network device 220 can transmit, receive, and repeat any message of the INSTEON® protocol, without requiring a master controller or routing software.

FIG. 17 illustrates the communication network 200 of control and communication devices 220 communicating over the network 200 using one or more of powerline signaling and RF signaling. In an embodiment, the communication network 200 comprises a mesh network. In another embodiment, the communication network 200 comprises a simulcast mesh network. In a further embodiment, the communication network 200 comprises an INSTEON® network.

Electrical power is most commonly distributed to buildings and homes in North America as single split-phase alternating current. At the main junction box to the building, the three-wire single-phase distribution system is split into two two-wire 110 VAC powerlines, known as Phase 1 and Phase 2. Phase 1 wiring is typically used for half the circuits in the building and Phase 2 is used for the other half. In the exemplary network 200, network devices 220a-220e are connected to a Phase 1 powerline 210 and network devices 220f-220h are connected to a Phase 2 powerline 228.

In the network 200, network device 220a is configured to communicate over the powerline; network device 220h is configured to communicate via RF; and network devices 220b-220g are configured to communicate over the powerline and via RF. Additionally network device 220b can be configured to communicate to the network controller or hub 250 and the network controller or hub 250 can be configured to communicate with the computer 230 and other digital equipment using, for example, RS232, USB, IEEE 802.3, or Ethernet protocols and communication hardware. The network controller or hub 250 on the network 200 communicating with the computer 230 and other digital devices can, for example, bridge to networks of otherwise incompatible devices in a building, connect to computers, act as nodes on a local-area network (LAN), or get onto the global Internet.

In an embodiment, the computer 230 comprises a personal computer, a laptop, a tablet, a smartphone, or the like, and interfaces with a user. The network controller or hub 250 can further be configured to provide information to a user through the computer 230.

In an embodiment, network devices 220a-220g that send and receive messages over the powerline use the INSTEON® Powerline protocol, and network devices 220b-220h that send and receive radio frequency (RF) messages use the INSTEON® RF protocol, as defined in U.S. Pat. Nos. 7,345,998 and 8,081,649 which are hereby incorporated by reference herein in their entireties. INSTEON® is a trademark of the applicant.

Network devices 220b-220h that use multiple media or layers solve a significant problem experienced by devices that only communicate via the powerline, such as network device 220a, or by devices that only communicate via RF, such as network device 220h. Powerline signals on opposite powerline phases 210 and 228 are severely attenuated because there is no direct circuit connection for them to travel. RF barriers can prevent direct RF communication between devices RF only devices. Using devices capable of communicating over two or more of the communication layers solves the powerline phase coupling problem whenever such devices are connected on opposite powerline phases and solves problems with RF barriers between RF devices. Thus, within the network 200, the powerline layer assists the RF layer, and the RF layer assists the powerline layer.

As shown in FIG. 17, network device 220a is installed on powerline Phase 1 210 and network device 220f is installed on powerline Phase 2 228. Network device 220a can communicate via powerline with network devices 220b-220e on powerline Phase 1 210, but it can also communicate via powerline with network device 220f on powerline Phase 2 228 because it can communicate over the powerline to network device 220e, which can communicate to network device 220f using RF signaling, which in turn is directly connected to powerline Phase 2 228. The dashed circle around network device 220f represents the RF range of network device 220f. Direct RF paths between network devices 220e to 220f (1 hop), for example, or indirect paths between network devices 220c to 220e and between network devices 220e to 220f, for example (2 hops) allow messages to propagate between the powerline phases.

Each network device 220a-220h is configured to repeat messages to others of the network devices 220a-220h on the network 200. In an embodiment, each network device 220a-220h is capable of repeating messages, using the protocols as described herein. Further, the network devices 220a-220h are peers, meaning that any device can act as a master (sending messages), slave (receiving messages), or repeater (relaying messages). Adding more devices configured to communicate over more than one physical layer increases the number of available pathways for messages to travel. Path diversity results in a higher probability that a message will arrive at its intended destination.

For example, RF network device 220d desires to send a message to network device 220e, but network device 220e is out of range. The message will still get through, however, because devices within range of network device 220d, such as network devices 220a-220c will receive the message and repeat it to other devices within their respective ranges. There are many ways for a message to travel: network device 220d to 220c to 220e (2 hops), network device 220d to 220a to 220c to 220e (3 hops), network device 220d to 220b to 220a to 220c to 220e (4 hops) are some examples.

Figure 18:
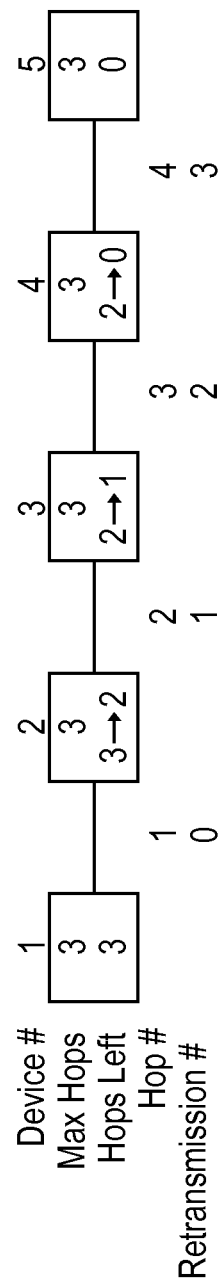
FIG. 18 is a block diagram illustrating message retransmission within the network, according to certain embodiments.

FIG. 18 is a block diagram illustrating message retransmission within the communication network 200. In order to improve network reliability, the network devices 220 retransmit messages intended for other devices on the network 200. This increases the range that the message can travel to reach its intended device recipient.

Unless there is a limit on the number of hops that a message may take to reach its final destination, messages might propagate forever within the network 200 in a nested series of recurring loops. Network saturation by repeating messages is known as a "data storm." The message protocol avoids this problem by limiting the maximum number of hops an individual message may take to some small number. In an embodiment, messages can be retransmitted a maximum of three times. In other embodiments, the number of times a message can be retransmitted is less than 3. In further embodiments, the number of times a message can be retransmitted is greater than 3. The larger the number of retransmissions, however, the longer the message will take to complete.

Embodiments comprise a pattern of transmissions, retransmissions, and acknowledgements that occurs when messages are sent. Message fields, such as Max Hops and Hops Left manage message retransmission. In an embodiment, messages originate with the 2-bit Max Hops field set to a value of 0, 1, 2, or 3, and the 2-bit Hops Left field set to the same value. A Max Hops value of zero tells other network devices 220 within range not to retransmit the message. A higher Max Hops value tells network devices 220 receiving the message to retransmit it depending on the Hops Left field. If the Hops Left value is one or more, the receiving device 220 decrements the Hops Left value by one and retransmits the message with the new Hops Left value. Network devices 220 that receive a message with a Hops Left value of zero will not retransmit that message. Also, the network device 220 that is the intended recipient of a message will not retransmit the message, regardless of the Hops Left value.

In other words, Max Hops is the maximum retransmissions allowed. All messages "hop" at least once, so the value in the Max Hops field is one less than the number of times a message actually hops from one device to another. In embodiments where the maximum value in this field is three, there can be four actual hops, comprising the original transmission and three retransmissions. Four hops can span a chain of five devices. This situation is shown schematically in FIG. 18.

Figure 19:
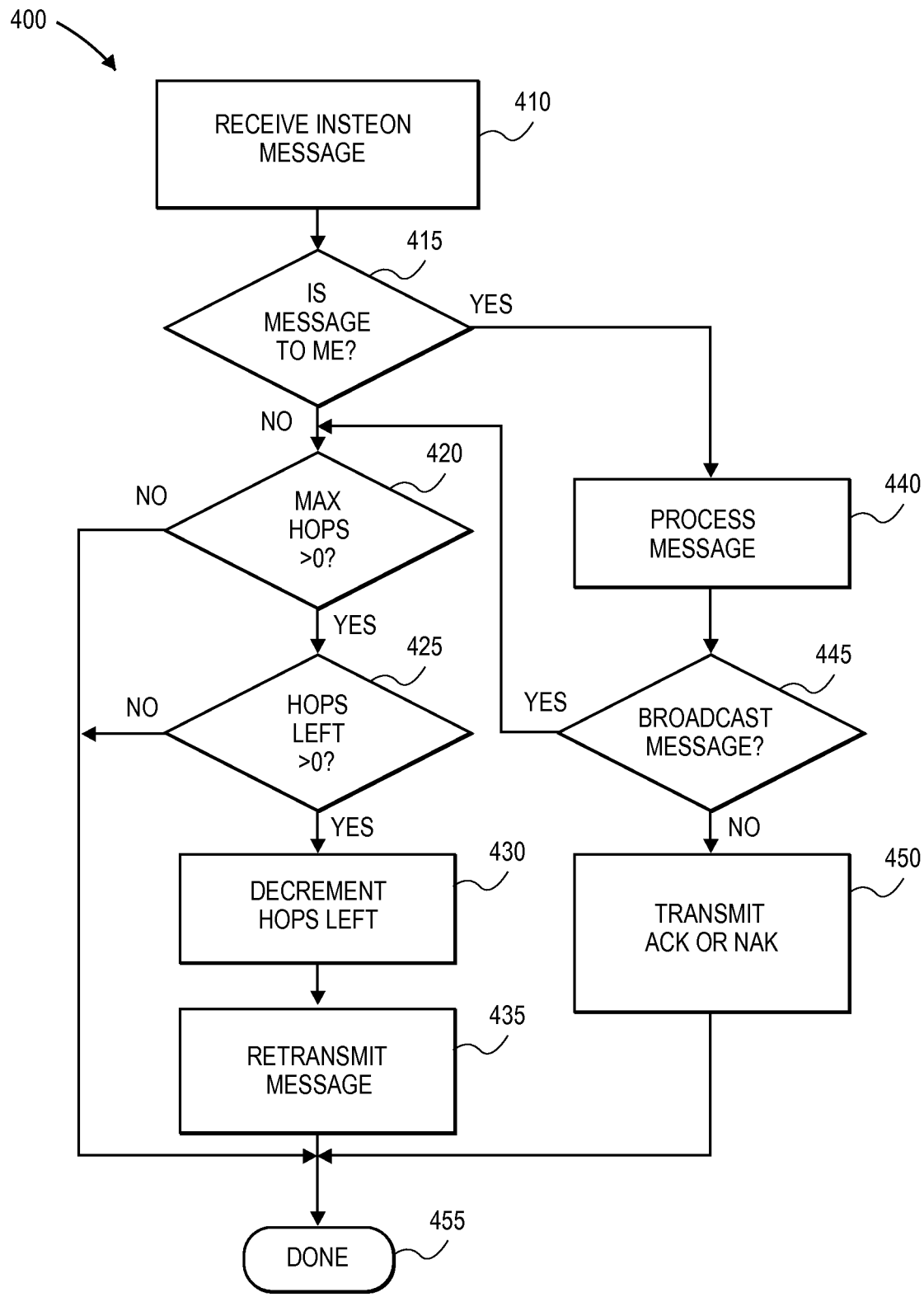
FIG. 19 illustrates a process to receive messages within the network, according to certain embodiments.

FIG. 19 illustrates a process 400 to receive messages within the communication network 200. The flowchart in FIG. 19 shows how the network device 220 receives messages and determines whether to retransmit them or process them. At step 410, the network device 220 receives a message via powerline or RF.

At step 415, the process 400 determines whether the network device 220 needs to process the received message. The network device 220 processes Direct messages when the network device 220 is the addressee, processes Group Broadcast messages when the network device 220 is a member of the group, and processes all Broadcast messages.

If the received message is a Direct message intended for the network device 220, a Group Broadcast message where the network device 220 is a group member, or a Broadcast message, the process 400 moves to step 440. At step 440, the network device 220 processes the received message.

At step 445, the process 400 determines whether the received message is a Group Broadcast message or one of a Direct message and Direct group-cleanup message. If the message is a Direct or Direct Group-cleanup message, the process moves to step 450. At step 450, the device sends an acknowledge (ACK) or a negative acknowledge (NAK) message back to the message originator in step 450 and ends the task at step 455.

In an embodiment, the process 400 simultaneously sends the ACK/NAK message over the powerline and via RF. In another embodiment, the process 400 intelligently selects which physical layer (powerline, RF) to use for ACK/NAK message transmission. In a further embodiment, the process 400 sequentially sends the ACK/NAK message using a different physical layer for each subsequent retransmission.

If at step 445, the process 400 determines that the message is a Broadcast or Group Broadcast message, the process 400 moves to step 420. If, at step 415, the process 400 determines that the network device 220 does not need to process the received message, the process 400 also moves to step 420. At step 420, the process 400 determines whether the message should be retransmitted.

At step 420, the Max Hops bit field of the Message Flags byte is tested. If the Max Hops value is zero, process 400 moves to step 455, where it is finished. If the Max Hops filed is not zero, the process 400 moves to step 425, where the Hops Left filed is tested.

If there are zero Hops Left, the process 400 moves to step 455, where it is finished. If the Hops Left field is not zero, the process 400 moves to step 430, where the process 400 decrements the Hops Left value by one.

At step 435, the process 400 retransmits the message. In an embodiment, the process 400 simultaneously retransmits the message over the powerline and via RF. In another embodiment, the process 400 intelligently selects which physical layer (PL, RF) to use for message retransmission. In a further embodiment, the process 400 sequentially retransmits the message using a different physical layer for each subsequent retransmission.

Figures 20, 21:
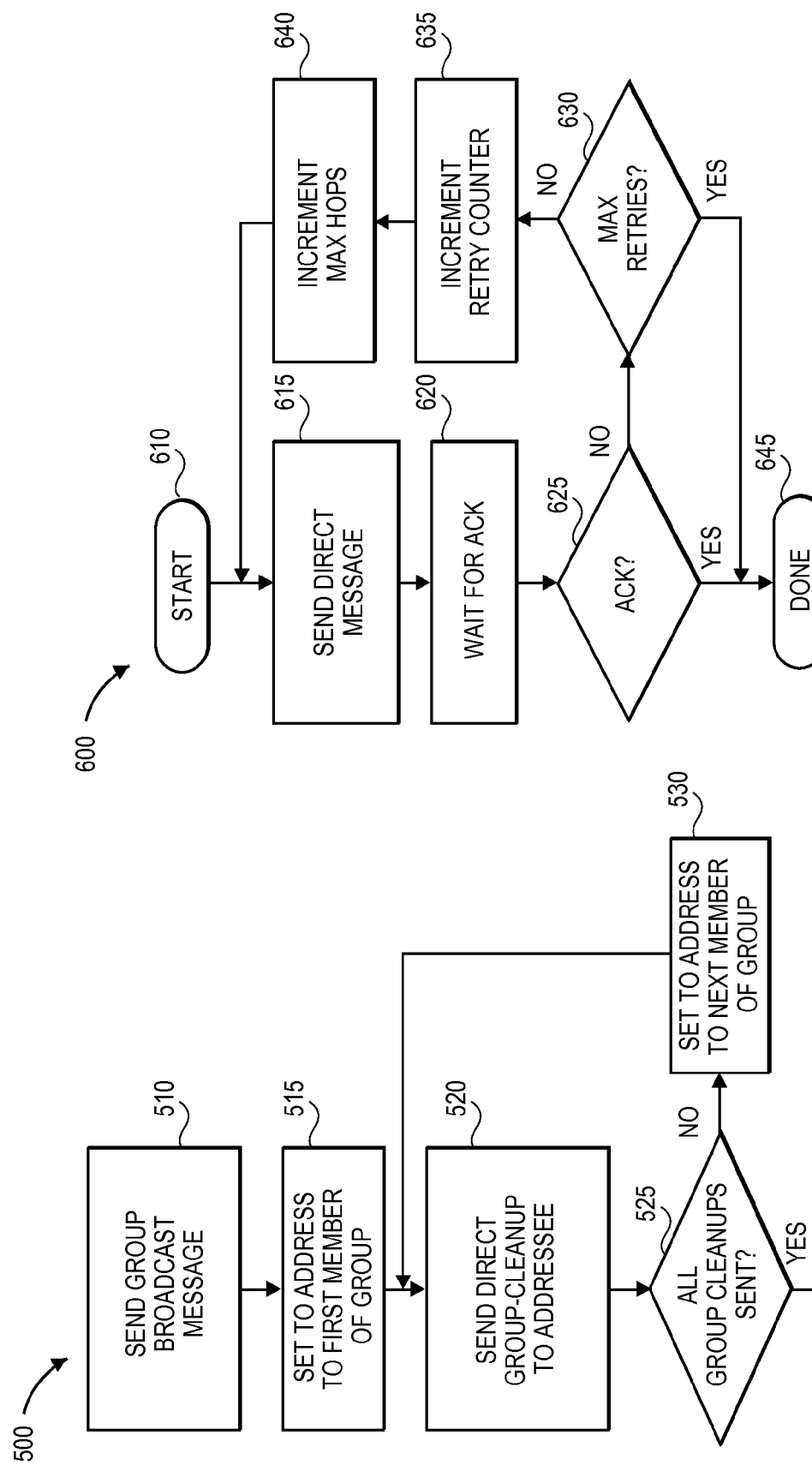
FIG. 20 illustrates a process to transmit messages to groups of network devices within the network, according to certain embodiments.
FIG. 21 illustrates a process to transmit direct messages with retries to network devices within the network, according to certain embodiments.

FIG. 20 illustrates a process 500 to transmit messages to multiple recipient devices 220 in a group within the communication network 200. Group membership is stored in a database in the network device 220 following a previous enrollment process. At step 510, the network device 220 first sends a Group Broadcast message intended for all members of a given group. The Message Type field in the Message Flags byte is set to signify a Group Broadcast message, and the To Address field is set to the group number, which can range from 0 to 255. The network device 220 transmits the message using at least one of powerline and radio frequency signaling. In an embodiment, the network device 220 transmits the message using both powerline and radio frequency signaling.

Following the Group Broadcast message, the transmitting device 220 sends a Direct Group-cleanup message individually to each member of the group in its database. At step 515, the network device 220 first sets the message To Address to that of the first member of the group, then it sends a Direct Group-cleanup message to that addressee at step 520. If Group-cleanup messages have been sent to every member of the group, as determined at step 525, transmission is finished at step 535. Otherwise, the network device 220 sets the message To Address to that of the next member of the group and sends the next Group-cleanup message to that addressee at step 520.

FIG. 21 illustrates a process 600 to transmit direct messages with retries to the network device 220 within the communication network 200. Direct messages can be retried multiple times if an expected ACK is not received from the addressee. The process 600 begins at step 610.

At step 615, the network device 220 sends a Direct or a Direct Group-cleanup message to an addressee. At step 620, the network device 220 waits for an Acknowledge message from the addressee. If, at step 625, an Acknowledge message is received and it contains an ACK with the expected status, the process 600 is finished at step 645.

If, at step 625, an Acknowledge message is not received, or if it is not satisfactory, a Retry Counter is tested at step 630. If the maximum number of retries has already been attempted, the process 600 fails at step 645. In an embodiment, network devices 220 default to a maximum number of retries of five. If fewer than five retries have been tried at step 630, the network device 220 increments its Retry Counter at step 635. At step 640, the network device 220 will also increment the Max Hops field in the Message Flags byte, up to a maximum of three, in an attempt to achieve greater range for the message by retransmitting it more times by more network devices 220. The message is sent again at step 615.

Figure 22:
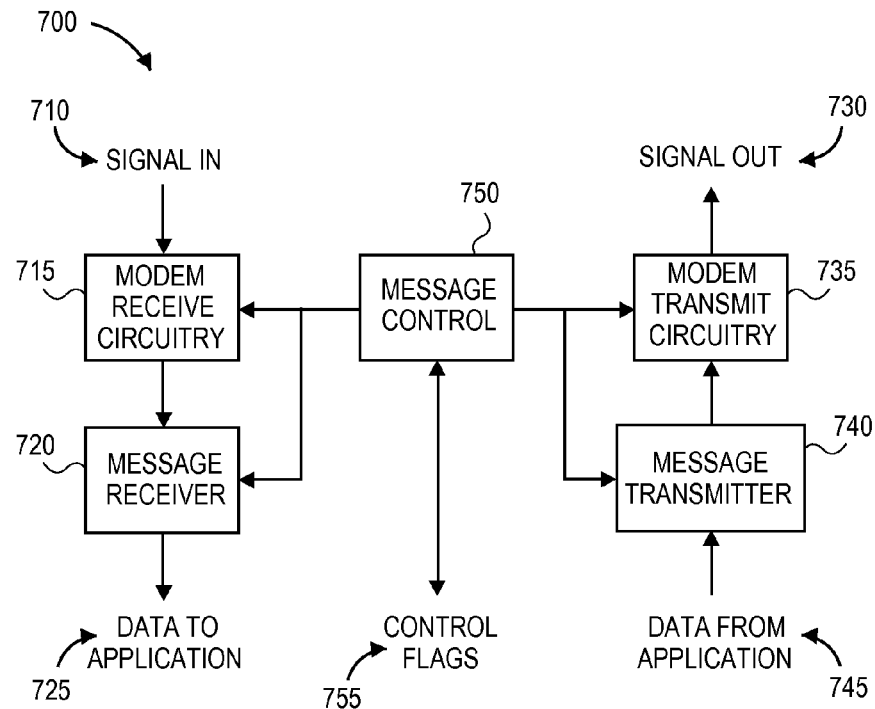
FIG. 22 is a block diagram illustrating the overall flow of information related to sending and receiving messages over the network, according to certain embodiments.

The network devices 220 comprise hardware and firmware that enable the network devices 220 to send and receive messages. FIG. 22 is a block diagram 700 of the network device 220 illustrating the overall flow of information related to sending and receiving messages. Received signals 710 come from the powerline, via radio frequency, or both. Signal conditioning circuitry 715 processes the raw signal and converts it into a digital bitstream. Message receiver firmware 720 processes the bitstream as required and places the message payload data into a buffer 725, which is available to the application running on the network device 220. A message controller 750 tells the application that data is available using control flags 755.

To send a message, the application places message data in a buffer 745, then tells the message controller 750 to send the message using the control flags 755. Message transmitter 740 processes the message into a raw bitstream, which it feeds to a modem transmitter 735. The modem transmitter 735 sends the bitstream as a powerline signal, a radio frequency signal, or both.

Figure 23:
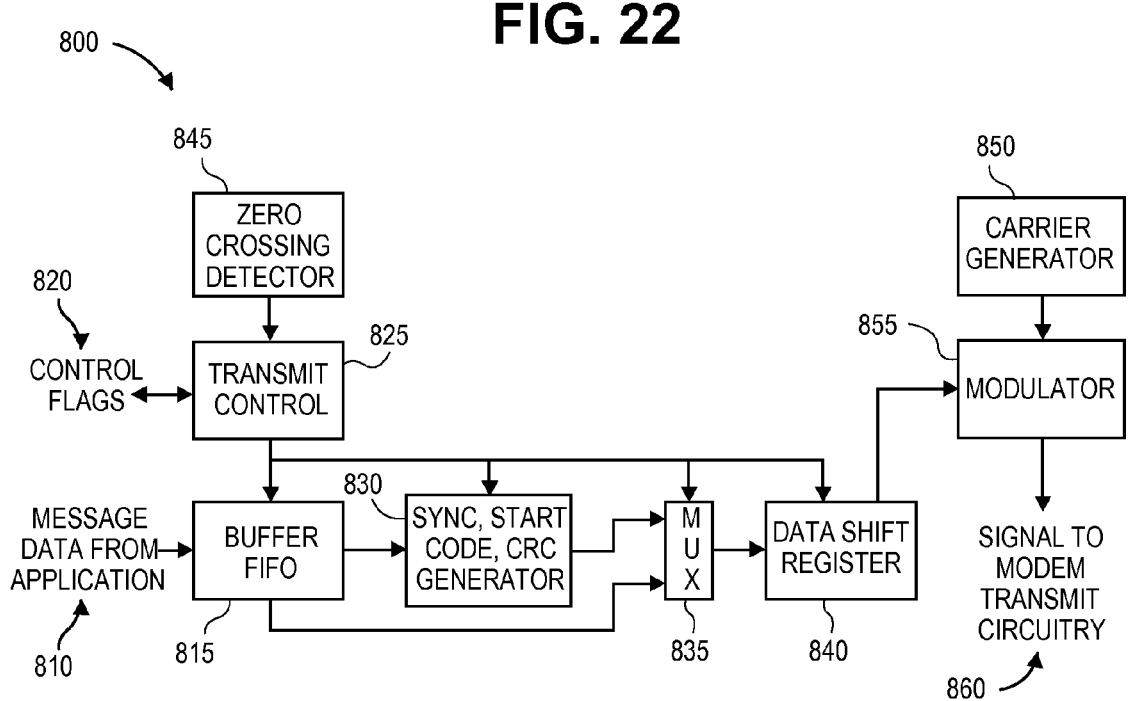
FIG. 23 is a block diagram illustrating the overall flow of information related to transmitting messages on the powerline, according to certain embodiments.

FIG. 23 shows a powerline message transmitter 800 and illustrates sending a message on the powerline. The application first composes a message 810 to be sent, excluding the cyclic redundancy check (CRC) byte, and puts the message data in a transmit buffer 815. The application then tells a transmit controller 825 to send the message by setting appropriate control flags 820. The transmit controller 825 packetizes the message data using multiplexer 835 to put sync bits and a start code from a generator 830 at the beginning of a packet followed by data shifted out of the first-in first-out (FIFO) transmit buffer 815.

As the message data is shifted out of FIFO transmit buffer 815, the CRC generator 830 calculates the CRC byte, which is appended to the bitstream by the multiplexer 835 as the last byte in the last packet of the message. The bitstream is buffered in a shift register 840 and clocked out in phase with the powerline zero crossings detected by zero crossing detector 845. The phase shift keying (PSK) modulator 855 shifts the phase of an approximately 131.65 kHz carrier signal from carrier generator 850 by approximately 180 degrees for zero-bits, and leaves the carrier signal unmodulated for one-bits. In other embodiments, the carrier signal can be greater than or less than approximately 131.65 kHz. Note that the phase is shifted gradually over one carrier period as disclosed in conjunction with FIG. 26. Finally, the modulated carrier signal 860 is applied to the powerline by the modem transmit circuitry 735 of FIG. 22.

Figure 24:
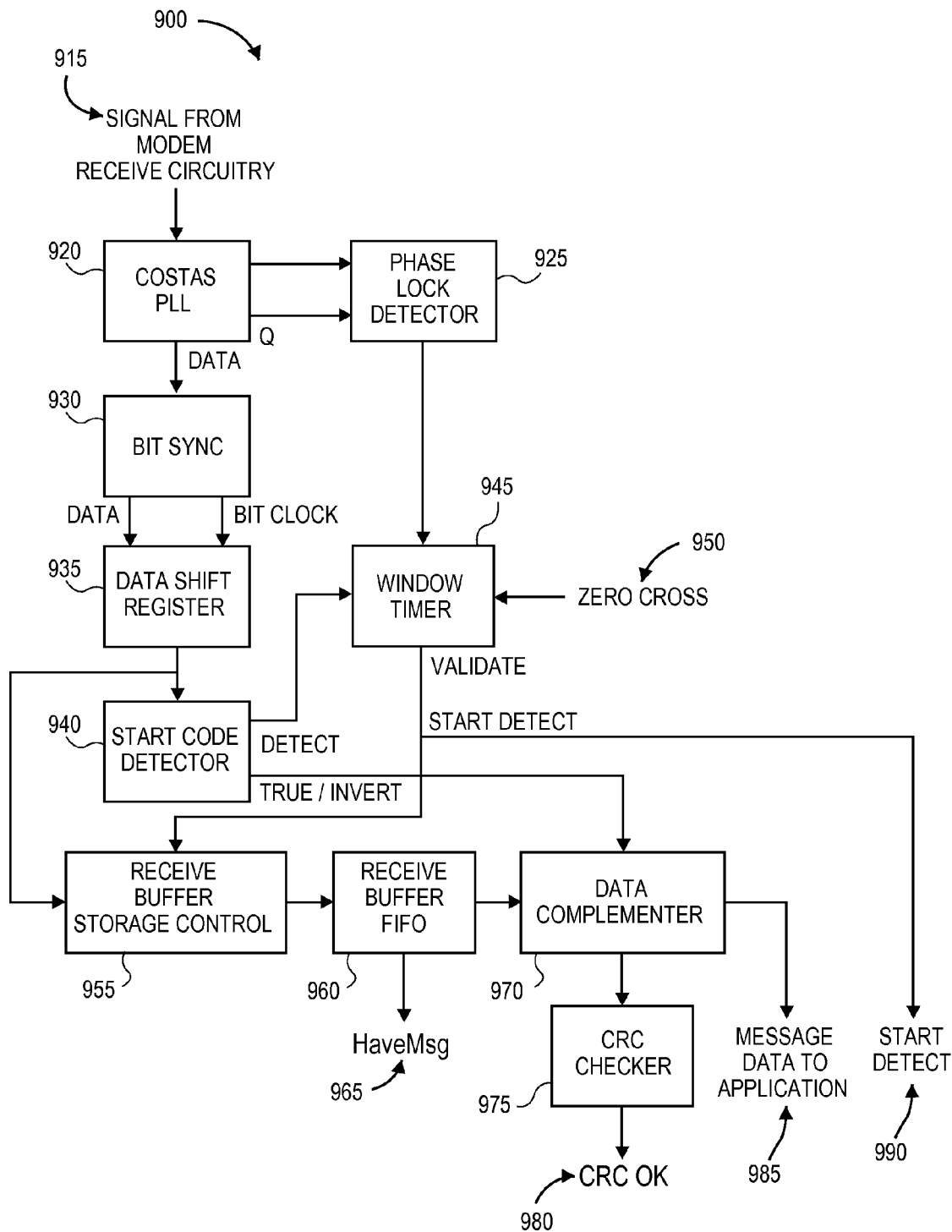
FIG. 24 is a block diagram illustrating the overall flow of information related to receiving messages from the powerline, according to certain embodiments.

FIG. 24 shows a powerline message receiver 900 and illustrates receiving a message from the powerline. The modem receive circuitry 715 of FIG. 22 conditions the signal on the powerline and transforms it into a digital data stream 915 that the firmware in FIG. 24 processes to retrieve messages. Raw data from the powerline is typically very noisy, because the received signal amplitude can be as low as only few millivolts, and the powerline often carries high-energy noise spikes or other noise of its own. Therefore, in an embodiment, a Costas phase-locked-loop (PLL) 920, implemented in firmware, is used to find the PSK signal within the noise. Costas PLLs, well known in the art, phase-lock to a signal both in phase and in quadrature. A phase-lock detector 925 provides one input to a window timer 945, which also receives a zero crossing signal 950 and an indication that a start code in a packet has been found by start code detector 940.

Whether it is phase-locked or not, the Costas PLL 920 sends data to the bit sync detector 930. When the sync bits of alternating ones and zeroes at the beginning of a packet arrive, the bit sync detector 930 will be able to recover a bit clock, which it uses to shift data into data shift register 935. The start code detector 940 looks for the start code following the sync bits and outputs a detect signal to the window timer 945 after it has found one. The window timer 945 determines that a valid packet is being received when the data stream begins approximately 800 microseconds before the powerline zero crossing, the phase lock detector 925 indicates lock, and detector 940 has found a valid start code. At that point the window timer 945 sets a start detect flag 990 and enables the receive buffer controller 955 to begin accumulating packet data from shift register 935 into the FIFO receive buffer 960. The storage controller 955 insures that the FIFO 960 builds up the data bytes in a message, and not sync bits or start codes. It stores the correct number of bytes, 10 for a standard message and 24 for an extended message, for example, by inspecting the Extended Message bit in the Message Flags byte. When the correct number of bytes has been accumulated, a HaveMsg flag 965 is set to indicate a message has been received.

Costas PLLs have a phase ambiguity of 180 degrees, since they can lock to a signal equally well in phase or anti-phase. Therefore, the detected data from PLL 920 may be inverted from its true sense. The start code detector 940 resolves the ambiguity by looking for the true start code, C3 hexadecimal, and its complement, 3C hexadecimal. If it finds the complement, the PLL is locked in antiphase and the data bits are inverted. A signal from the start code detector to 940 tells the data complementer 970 whether to un-invert the data or not. The CRC checker 975 computes a CRC on the received data and compares it to the CRC in the received message. If they match, the CRC OK flag 980 is set.

Data from the complementer 970 flows into an application buffer, not shown, via path 985. The application will have received a valid message when the HaveMsg flag 965 and the CRC OK flag 980 are both set.

Figure 25:
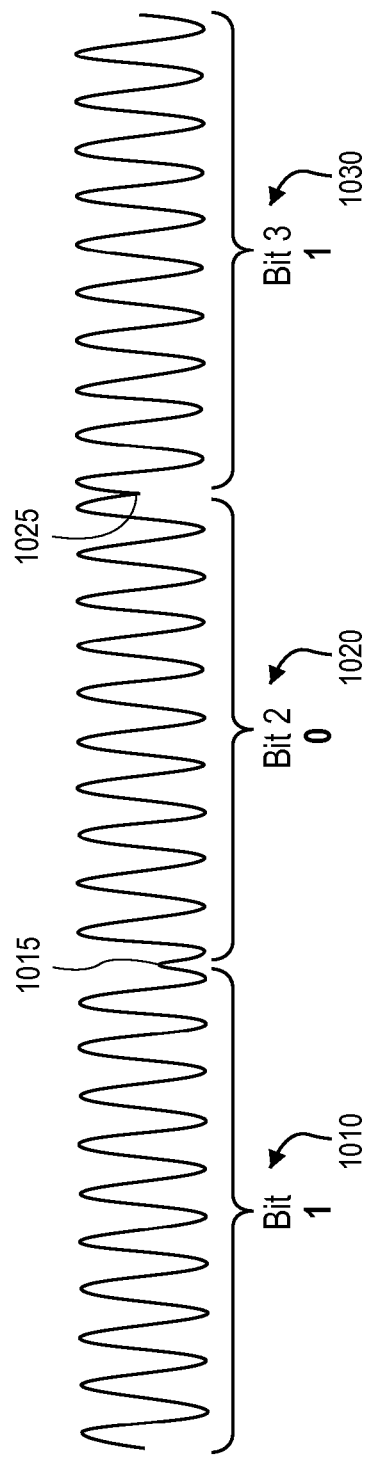
FIG. 25 illustrates a powerline signal, according to certain embodiments.

FIG. 25 illustrates an exemplary 131.65 kHz powerline carrier signal with alternating BPSK bit modulation. Each bit uses ten cycles of carrier. Bit 1010, interpreted as a one, begins with a positive-going carrier cycle. Bit 2 1020, interpreted as a zero, begins with a negative-going carrier cycle. Bit 3 1030, begins with a positive-going carrier cycle, so it is interpreted as a one. Note that the sense of the bit interpretations is arbitrary. That is, ones and zeroes could be reversed as long as the interpretation is consistent. Phase transitions only occur when a bitstream changes from a zero to a one or from a one to a zero. A one followed by another one, or a zero followed by another zero, will not cause a phase transition. This type of coding is known as NRZ or nonreturn to zero.

FIG. 25 shows abrupt phase transitions of 180 degrees at the bit boundaries 1015 and 1025. Abrupt phase transitions introduce troublesome high-frequency components into the signal's spectrum. Phase-locked detectors can have trouble tracking such a signal. To solve this problem, the powerline encoding process uses a gradual phase change to reduce the unwanted frequency components.

Figure 26:
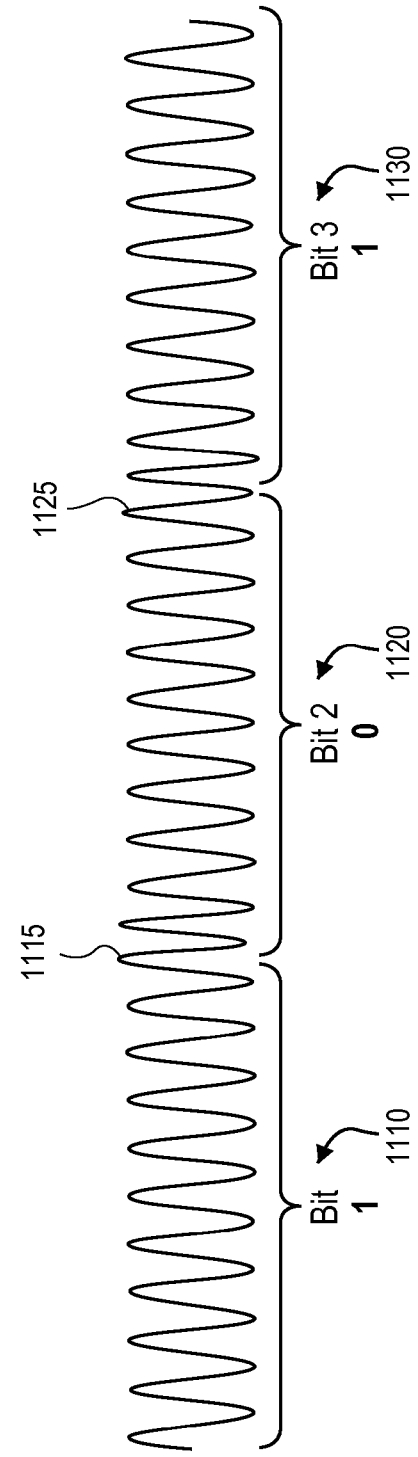
FIG. 26 illustrates a powerline signal with transition smoothing, according to certain embodiments.

FIG. 26 illustrates the powerline BPSK signal of FIG. 25 with gradual phase shifting of the transitions. The transmitter introduces the phase change by inserting approximately 1.5 cycles of carrier at 1.5 times the approximately 131.65 kHz frequency. Thus, in the time taken by one cycle of 131.65 kHz, three half-cycles of carrier will have occurred, so the phase of the carrier is reversed at the end of the period due to the odd number of half-cycles. Note the smooth transitions 1115 and 1125.

In an embodiment, the powerline packets comprise 24 bits. Since a bit takes ten cycles of 131.65 kHz carrier, there are 240 cycles of carrier in a packet, meaning that a packet lasts approximately 1.823 milliseconds. The powerline environment is notorious for uncontrolled noise, especially high-amplitude spikes caused by motors, dimmers, and compact fluorescent lighting. This noise is minimal during the time that the current on the powerline reverses direction, a time known as the powerline zero crossing. Therefore, the packets are transmitted near the zero crossing.

Figure 27:
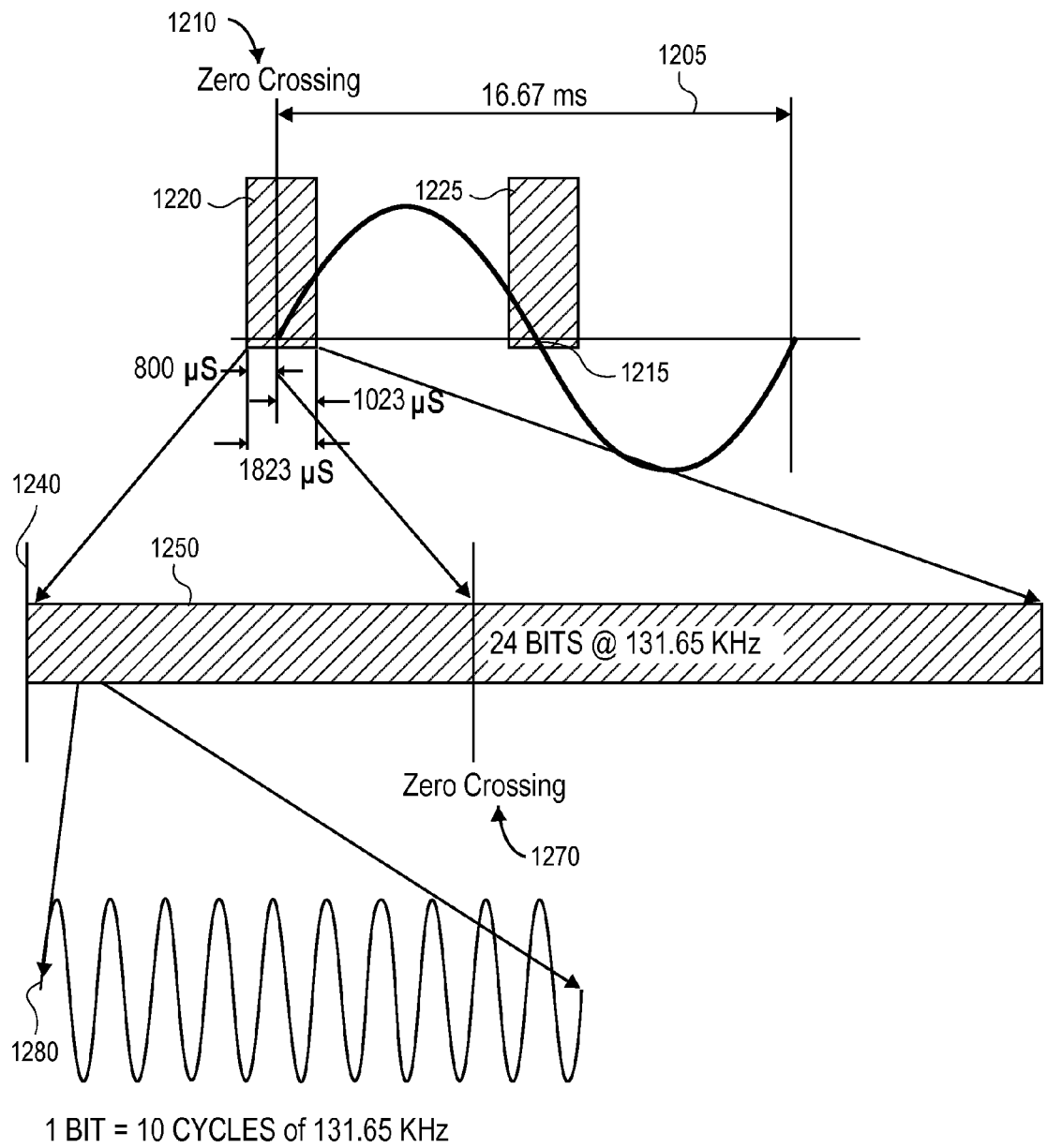
FIG. 27 illustrates powerline signaling applied to the powerline, according to certain embodiments.

FIG. 27 illustrates powerline signaling applied to the powerline. Powerline cycle 1205 possesses two zero crossings 1210 and 1215. A packet 1220 is at zero crossing 1210 and a second packet 1225 is at zero crossing 1215. In an embodiment, the packets 1220, 1225 begin approximately 800 microseconds before a zero crossing and last until approximately 1023 microseconds after the zero crossing.

In some embodiments, the powerline transmission process waits for one or two additional zero crossings after sending a message to allow time for potential RF retransmission of the message by network devices 220.

Figure 28:
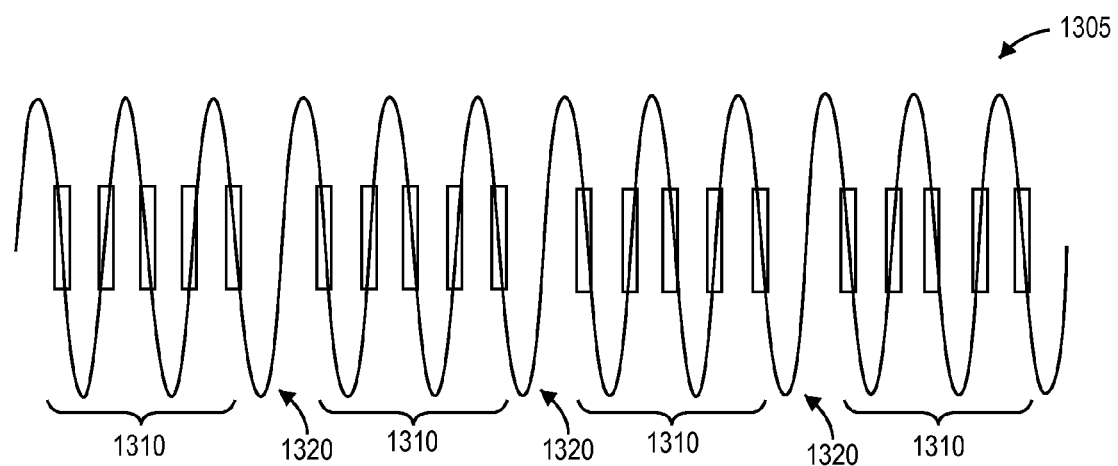
FIG. 28 illustrates standard message packets applied to the powerline, according to certain embodiments.
Figure 29:
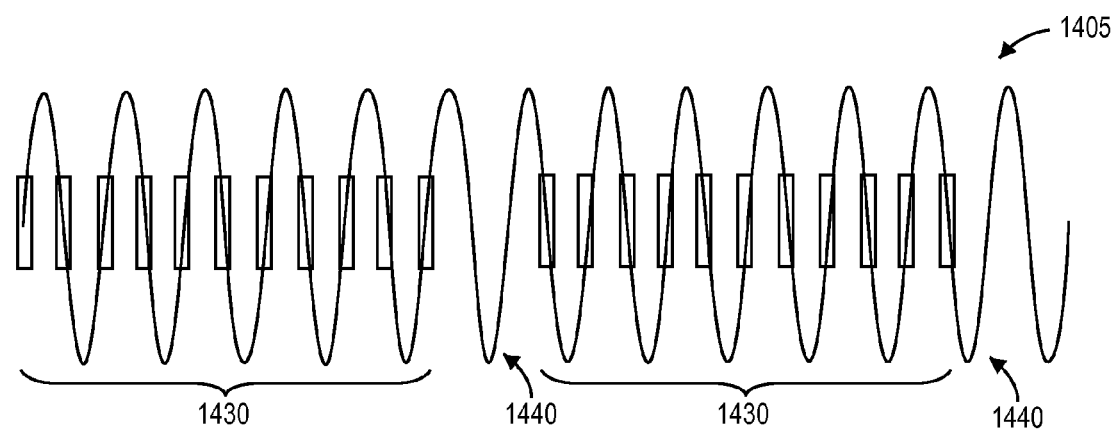
FIG. 29 illustrates extended message packets applied to the powerline, according to certain embodiments.

FIG. 28 illustrates an exemplary series of five-packet standard messages 1310 being sent on powerline signal 1305. In an embodiment, the powerline transmission process waits for at least one zero crossing 1320 after each standard message 1310 before sending another packet. FIG. 29 illustrates an exemplary series of eleven-packet extended messages 1430 being sent on the powerline signal 1405. In another embodiment, the powerline transmission process waits for at least two zero crossings 1440 after each extended message before sending another packet. In other embodiments, the powerline transmission process does not wait for extra zero crossings before sending another packet.

In some embodiments, standard messages contain 120 raw data bits and use six zero crossings, and take approximately 50 milliseconds to send. In some embodiments, extended messages contain 264 raw data bits and use thirteen zero crossings, and take approximately 108.33 milliseconds to send. Therefore, the actual raw bitrate is approximately 2,400 bits per second for standard messages 1310, and approximately 2,437 bits per second for extended messages 1430, instead of the 2880 bits per second the bitrate would be without waiting for the extra zero crossings 1320, 1440.

In some embodiments, standard messages contain 9 bytes (72 bits) of usable data, not counting packet sync and start code bytes, and not counting the message CRC byte. In some embodiments, extended messages contain 23 bytes (184 bits) of usable data using the same criteria. Therefore, the bitrates for usable data are further reduced to 1440 bits per second for standard messages 1310 and 1698 bits per second for extended messages 1430. Counting only the 14 bytes (112 bits) of User Data in extended messages, the User Data bitrate is 1034 bits per second.

The network devices 220 can send and receive the same messages that appear on the powerline using radio frequency signaling. Unlike powerline messages, however, messages sent by radio frequency are not broken up into smaller packets sent at powerline zero crossings, but instead are sent whole. As with powerline, in an embodiment, there are two radio frequency message lengths: standard 10-byte messages and extended 24-byte messages.

Figure 30:
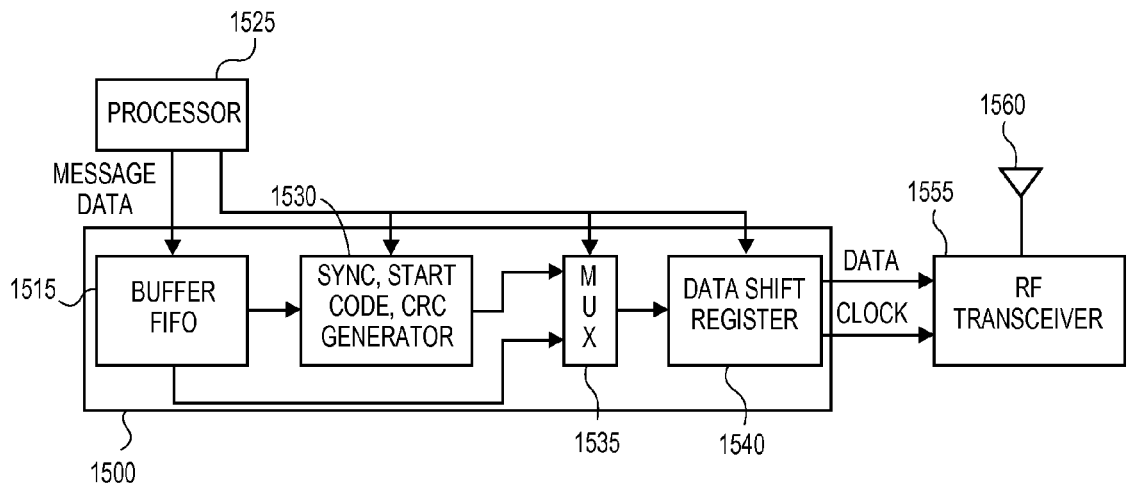
FIG. 30 is a block diagram illustrating the overall flow of information related to transmitting messages via RF, according to certain embodiments.

FIG. 30 is a block diagram illustrating message transmission using radio frequency (RF) signaling comprising processor 1525, RF transceiver 1555, antenna 1560, and RF transmit circuitry 1500. The RF transmit circuitry 1500 comprises a buffer FIFO 1525, a generator 1530, a multiplexer 1535, and a data shift register 1540.

The steps are similar to those for sending powerline messages in FIG. 23, except that radio frequency messages are sent all at once in a single packet. In FIG. 30, the processor 1525 composes a message to send, excluding the CRC byte, and stores the message data into the transmit buffer 1515. The processor 1525 uses the multiplexer 1535 to add sync bits and a start code from the generator 1530 at the beginning of the radio frequency message followed by data shifted out of the first-in first-out (FIFO) transmit buffer 1515.

As the message data is shifted out of FIFO 1515, the CRC generator 1530 calculates the CRC byte, which is appended to the bitstream by the multiplexer 1535 as the last byte of the message. The bitstream is buffered in the shift register 1540 and clocked out to the RF transceiver 1555. The RF transceiver 1555 generates an RF carrier, translates the bits in the message into Manchester-encoded symbols, frequency modulates the carrier with the symbol stream, and transmits the resulting RF signal using antenna 1560. In an embodiment, the RF transceiver 1555 is a single-chip hardware device and the other steps in FIG. 30 are implemented in firmware running on the processor 1525.

Figure 31:
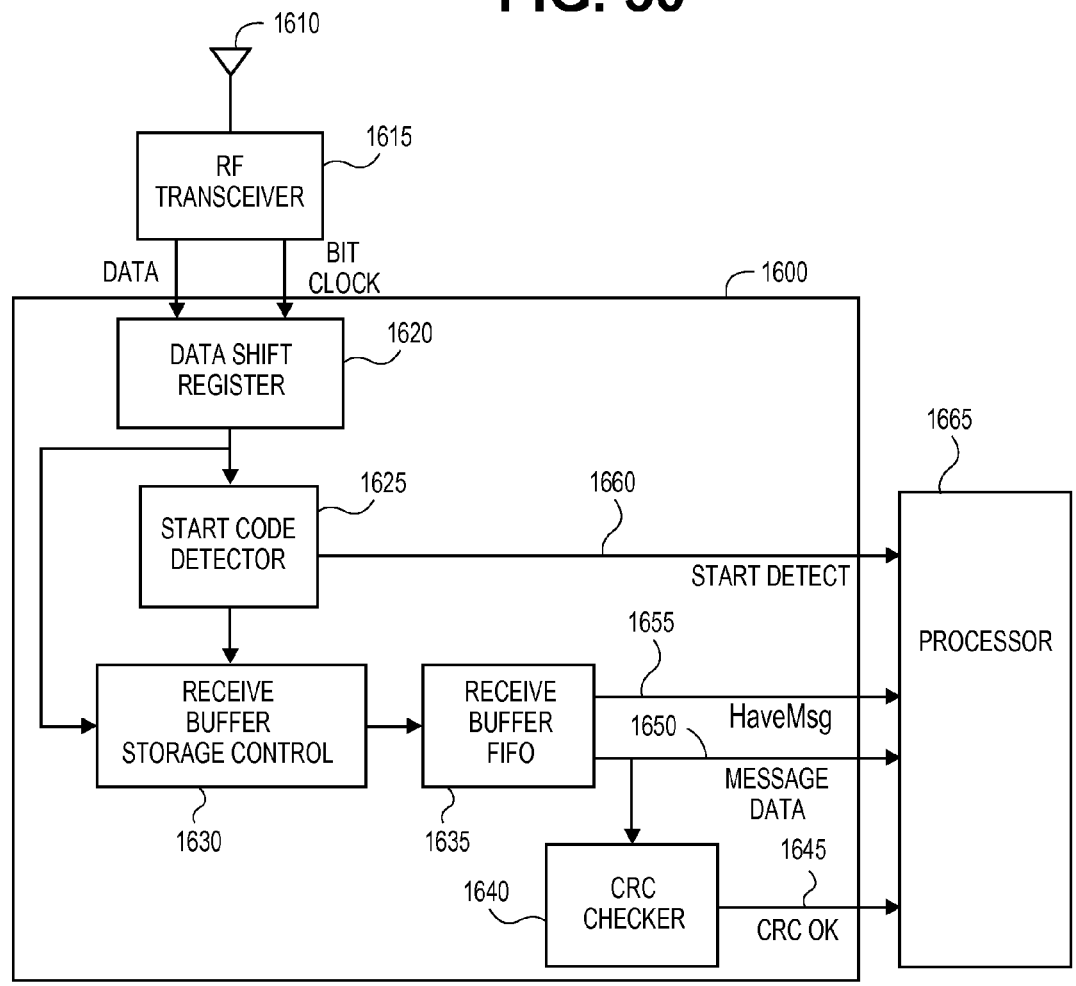
FIG. 31 is a block diagram illustrating the overall flow of information related to receiving messages via RF, according to certain embodiments.

FIG. 31 is a block diagram illustrating message reception using the radio frequency signaling comprising processor 1665, RF transceiver 1615, antenna 1610, and RF receive circuitry 1600. The RF receive circuitry 1600 comprises a shift register 1620, a code detector 1625, a receive buffer storage controller 1630, a buffer FIFO 1635, and a CRC checker 1640.

The steps are similar to those for receiving powerline messages given in FIG. 24 except that radio frequency messages are sent all at once in a single packet. In FIG. 31, the RF transceiver 1615 receives an RF transmission from antenna 1610 and frequency demodulates it to recover the baseband Manchester symbols. The sync bits at the beginning of the message allow the transceiver 1615 to recover a bit clock, which it uses to recover the data bits from the Manchester symbols. The transceiver 1615 outputs the bit clock and the recovered data bits to shift register 1620, which accumulates the bitstream in the message.

The start code detector 1625 looks for the start code following the sync bits at the beginning of the message and outputs a detect signal 1660 to the processor 1665 after it has found one. The start detect flag 1660 enables the receive buffer controller 1630 to begin accumulating message data from shift register 1620 into the FIFO receive buffer 1635. The storage controller 1630 insures that the FIFO receive buffer 1635 stores the data bytes in a message, and not the sync bits or start code. In an embodiment, the storage controller 1630 stores 10 bytes for a standard message and 24 for an extended message, by inspecting the Extended Message bit in the Message Flags byte.

When the correct number of bytes has been accumulated, a HaveMsg flag 1655 is set to indicate a message has been received. The CRC checker 1640 computes a CRC on the received data and compares it to the CRC in the received message. If they match, the CRC OK flag 1645 is set. When the HaveMsg flag 1655 and the CRC OK flag 1645 are both set, the message data is ready to be sent to processor 1665. In an embodiment, the RF transceiver 1615 is a single-chip hardware device and the other steps in FIG. 31 are implemented in firmware running on the processor 1665.

FIG. 32 is a table 1700 of exemplary specifications for RF signaling within the communication network 200. In an embodiment, the center frequency lies in the band of approximately 902 to 924 MHz, which is permitted for non-licensed operation in the United States. In certain embodiments, the center frequency is approximately 915 MHz. Each bit is Manchester encoded, meaning that two symbols are sent for each bit. A one-symbol followed by a zero-symbol designates a one-bit, and a zero-symbol followed by a one-symbol designates a zero-bit.

Symbols are modulated onto the carrier using frequency-shift keying (FSK), where a zero-symbol modulates the carrier by half of the FSK deviation frequency downward and a one-symbol modulates the carrier by half of the FSK deviation frequency upward. The FSK deviation frequency is approximately 64 kHz. In other embodiments, the FSK deviation frequency is between approximately 100 kHz and 200 kHz. In other embodiments, the FSK deviation frequency is less than 64 kHz. In further embodiment, the FSK deviation frequency is greater than 200 kHz. Symbols are modulated onto the carrier at approximately 38,400 symbols per second, resulting in a raw data rata of half that, or 19,200 bits per second. The typical range for free-space reception is 150 feet, which is reduced in the presence of walls and other RF energy absorbers.

In other embodiments, other encoding schemes, such as return to zero (RZ), Nonreturn to Zero-Level (NRZ-L), Nonreturn to Zero Inverted (NRZI), Bipolar Alternate Mark Inversion (AMI), Pseudoternary, differential Manchester, Amplitude Shift Keying (ASK), Phase Shift Keying (PSK, BPSK, QPSK), and the like, could be used.

Network devices 220 transmit data with the most-significant bit sent first. In an embodiment, RF messages begin with two sync bytes comprising AAAA in hexadecimal, followed by a start code byte of C3 in hexadecimal. Ten data bytes follow in standard messages, or twenty-four data bytes in extended messages. The last data byte in a message is a CRC over the data bytes as disclosed above.

Other Embodiments

The examples of cloud server adaptive learning, network controller adaptive learning, and network device adaptive learning herein are for illustrative purposes and are non-limiting. In other embodiment, the home-control system 240 may combine elements of the cloud server adaptive learning, network controller adaptive learning, and network device adaptive learning to provide adaptive learning. For example, the network device adaptive learning system could use the cloud data found in the cloud server adaptive learning system.

Cloud Server Adaptive Learning

The cloud server downloads sensor information from the Internet, such as traffic patterns, weather information, and utility rates, for example. The cloud server can also receive sensor information from social media, such as Facebook®, and the like, associated with the user or others, and information from the user's smart phone, car, or work computer, for example. Further, the cloud server receives local network actions as well as the network actions from a plurality of home-control networks across a large geographic area, which can be subdivided with increasing granularity. In an embodiment, the cloud server receives the network actions from geographically close or neighboring home-control networks.

The cloud server aggregates the device actions. From the aggregate of the device actions, the cloud server creates snapshot behaviors, learned sequences, scenes, and timers, which can be continuously updated. The cloud server sends commands to the device via the network controller based on the sensor information to implement the snapshots, sequences, scenes, and timers.

For example, if the aggregate actions indicate that the hot tub heater is set to 100° C. fifteen minutes after the front door opens on sunny weekday afternoons, then the cloud server can send commands to the hot tub heater to turn on and set the water temperature to 100° C. when the weather is sunny, it is a weekday, and the user's smartphone is within a specified geo-fencing ring.

In addition, the cloud server can implement load-shedding behavior based on utility rates or a user-set sliding scale between comfort and economy. Further, analysis of network activity of others and broader web data allow learning and adjusting device behaviors based on such things as local neighborhood activity, and broader social connected activity. For example, the cloud server could use the neighbors' overall power usage to adjust the use of power on the user's home-control network. The cloud server could access friends' scenes for suggestions or improvements on the user's scenes.

The user can interface with the cloud server where the cloud server can send the device behavior to the device through the network controller and the network.

According to a number of embodiments, the disclosure relates to a method to automatically control network devices on a user's home-control network. The method comprises electronically receiving at a server network data from a plurality of home-control networks. Each home-control network comprises a network controller and at least one network device and is configured to propagate messages. The messages comprise commands to control a behavior of the network device. The method further comprises electronically receiving at the server cloud data over a global network from one or more third party sources and automatically controlling with the server the at least one network device on a user's home-control network based at least in part on the network data from the plurality of home-control networks and the cloud data.

In an embodiment, the method further comprises aggregating with the server the network data received from the plurality of home-control networks. In another embodiment, the network data is aggregated based at least in part on a geographic area associated with a location of the user's home-control network. In a further embodiment, the geographic area comprises one of a state, a county, a city, and a neighborhood. In a yet further embodiment, the method further comprises analyzing with the server the aggregated network data and the cloud data. In a yet further embodiment, the method further comprises sending with the server a message over the global network to the network controller associated with the user's home-control network, where the message is based at least in part on the analysis and comprising a command configured to control the at least one network device on the user's home-control network.

Certain embodiments relate to a system to automatically control network devices on a user's home-control network. The system comprises a cloud server configured to receive network data from a plurality of home-control networks. Each home-control network comprises a network controller and at least one network device and is configured to propagate messages. The messages comprise commands to control a behavior of the network device. The cloud server is further configured to electronically access cloud data over a global network from one or more third party sources, and to automatically control the at least one network device on a user's home-control network based at least in part on the network data from the plurality of home-control networks and the cloud data.

In an embodiment, the cloud server is further configured to aggregate the network data received from the plurality of home-control networks. In another embodiment, the network data is aggregated based at least in part on a geographic area associated with a location of the user's home-control network. In a further embodiment, the geographic area comprises one of a state, a county, a city, and a neighborhood. In a yet further embodiment, the cloud server is further configured to analyze the aggregated network data and the cloud data.

In an embodiment, the cloud server is further configured to send a message over the global network to a network controller associated with the user's home-control network, the message based at least in part on the analysis and comprising a command configured to control the at least one network device on the user's home-control network. In another embodiment, the network controller associated with the user's home-control network is configured to send the message to the at least one network device on the user's home-control network using at least one of the powerline signaling and the RF signaling.

In an embodiment, the messages are propagated using powerline signaling and radio frequency (RF) signaling, wherein the powerline signaling comprises message data modulated onto a carrier signal and the modulated carrier signal is added to a powerline waveform, and wherein the RF signaling comprises the message data modulated onto an RF waveform. In another embodiment, the cloud data comprises one or more of weather data, traffic data, geo-fencing data, social media content, solar calendar data, and celestial calendar data. In a further embodiment, the at least one network device on the user's home-control network comprises one or more of a door controller, a window blind controller, a water valve controller, an alarm, a thermostat, a lighting device, and a ceiling fan.

According to a number of embodiments, the disclosure relates to a method to automatically control a water valve on a user's home-control network. The method comprises electronically receiving network data from a plurality of home-control networks. Each home-control network comprises a network controller and at least a water valve. The home-control network is configured to propagate messages, and the messages comprise commands to control a state of the water valve. The method further comprises aggregating the network data associated with the state of water valves from the plurality of home-control networks within a geographic area of the user's home control network, receiving weather information for the geographic area from a weather service over a global network, receiving location information comprising a location of a user from a geo-location device over the global network, and automatically controlling the water valve on the user's home-control network based at least in part on the aggregated network data, the weather information, and the location information.

In an embodiment, the method further comprises determining, based on the aggregated network data, whether a number of the water valves associated with the plurality of home-control networks within the geographic area have been enabled to drain water pipes. In another embodiment, the method further comprises determining, based on the weather information, whether a freeze event is expected within a time period. In a further embodiment, the method further comprises determining, based on the location information, whether the user is away from the user's home-control network. In a yet further embodiment, the method further comprises automatically controlling the water valve on the user's home-control network to drain water from the pipes when the number is greater than a threshold, the freeze event is expected within the time period, and the user is away.

In an embodiment, the method further comprises sending a message over the global network to the network controller associated with the user's home-control network, where the message comprises a command configured to control the water valve on the user's home-control network. In another embodiment, the network controller associated with the user's home-control network is configured to send the message to the water valve on the user's home-control network using at least one of the powerline signaling and the RF signaling. In a further embodiment, the method further comprises sending a notification to the user reporting the state of the water valve on the user's home control network after automatically controlling the water valve. In a yet further embodiment, the method further comprises sending a request to the user before automatically controlling the water valve.

Certain embodiments relate to a system to automatically control a water valve on a user's home-control network. The system comprises cloud-based computer hardware configured to receive network data from a plurality of home-control networks. Each home-control network comprises a network controller and at least a water valve, where the home-control network is configured to propagate messages, and the messages comprise commands to control a state of the water valve. The cloud-based computer hardware is configured to aggregate the network data associated with the state of water valves from the plurality of home-control networks within a geographic area of the user's home control network, to receive weather information for the geographic area from a weather service over a global network and to receive location information comprising a location of a user from a geo-location device over the global network, to analyze the aggregated network data, the weather information, and the location information, and to generate a message to control the state of the water valve on the user's home-control network based at least in part on the analysis.

In an embodiment, the cloud-based computer hardware is further configured to determine, based on the aggregated network data, whether a number of the water valves associated with the plurality of home-control networks within the geographic area have been enabled to drain water pipes. In another embodiment, the cloud-based computer hardware is further configured to determine, based on the weather information, whether a freeze event is expected within a time period. In a further embodiment, the cloud-based computer hardware is further configured to determine, based on the location information, whether the user is away from the user's home-control network. In a yet further embodiment, the cloud-based computer hardware is further configured to automatically control the water valve on the user's home-control network to drain water from the pipes when the number is greater than a threshold, the freeze event is expected within the time period, and the user is away.

In an embodiment, the cloud-based computer hardware is further configured to send a message over the global network to the network controller associated with the user's home-control network, the message comprising a command configured to control the water valve on the user's home-control network. In another embodiment, the network controller associated with the user's home-control network is configured to send the message to the water valve on the user's home-control network using at least one of the powerline signaling and the RF signaling. In a further embodiment, the cloud-based computer hardware is further configured to send a notification to the user reporting the state of the water valve on the user's home control network. In a yet further embodiment, the cloud-based computer hardware is further configured to send a request to the user to control the water valve.

Network Controller Adaptive Learning

The network controller receives sensor information from sensors local to the home-control network, such as a clock, the user's calendar, a light sensor, a temperature sensor, for example. In addition, the network controller receives from the cloud server stimulus data, such as information from social media, information from the user's smart phone, car, or work computer, traffic patterns, weather, and utility rates, for example. The network controller also receives user actions and local network actions.

The network controller aggregates the device actions. From the aggregate of the device actions, the network controller creates snapshot behaviors, learned sequences, scenes, and timers, which can be continuously updated. The network controller sends commands to the device via the network based on the sensor information to implement the snapshots, sequences, scenes, and timers.

For example, if the aggregate actions indicate that the hot tub heater is set to 100° fifteen minutes after the front door opens on sunny weekday afternoons, then the network controller can send commands to the hot tub heater to turn on and set the water temperature to 100° when the weather is sunny, it is a weekday, and the user's smartphone is within a specified geo-fencing ring. In addition, the network controller can implement load-shedding behavior based on utility rates or a user set sliding scale between comfort and economy.

The user can interact directly with the network controller through the network controller's user interface, or the user can interface with the network controller through the cloud server.

According to a number of embodiments, the disclosure relates to a method to automatically control a network device on a home-control network. The method comprises receiving with a network controller network data from network devices on a home-control network. The home-control network is configured to propagate messages comprising the network data. The network data comprises one or more of a command, a response, and status associated with at least a first network device and a second network device on the home-control network. The method further comprises storing in memory past network data associated with the second network device, receiving with the network controller sensor data from a sensor configured to measure a parameter, and automatically controlling with the network controller a behavior of the first network device based at least in part on the past network data from the second network device and the sensor data.

In an embodiment, the method further comprises analyzing with the network controller the past network data from the second network device to determine a range of the parameter associated with more past network data from the second network device than other ranges of the parameter. In another embodiment, the method further comprises determining with the network controller whether a current parameter is within the range of the parameter associated with the more past network data from the second network device than the other ranges of the parameter. In a further embodiment, the method further comprises determining with the network controller whether a state of the first network device comprises a first state. In a yet further embodiment, the method further comprises changing the behavior of the first network device with the network controller when the current parameter is within the range of the parameter associated with the more past network data from the second network device than the other ranges of the parameter and the state of the first network device comprises the first state.

In an embodiment, the method further comprises sending a message with the network controller over the home-control network to the first network device, where the message comprises a command configured to control the first network device. In another embodiment, the method further comprises receiving with the network controller cloud data from a cloud server over a global network. In a further embodiment, the method further comprises automatically controlling with the network controller the behavior of the first network device based at least in part on the past network data from the second network device, the sensor data, and the cloud data. In a yet further embodiment, the cloud data comprises one or more of weather data, traffic data, geo-fencing data, social media content, solar calendar data, and celestial calendar data.

Certain embodiments relate to a system to automatically control network devices on a home-control network. The system comprises a network controller configured to receive network data from network devices on a home-control network, where the home-control network is configured to propagate messages comprising the network data, and the network data comprises one or more of a command, a response, and status associated with at least a first network device and a second network device on the home-control network. The network controller is further configured to store in memory past network data associated with the second network device. The system further comprises a sensor configured to provide sensor data measuring a parameter. The network controller is further configured to receive the sensor data, and to automatically control a behavior of the first network device based at least in part on the past network data from the second network device and the sensor data.

In an embodiment, the network controller is further configured to analyze the past network data from the second network device to determine a range of the parameter associated with more past network data from the second network device than other ranges of the parameter. In another embodiment, the network controller is further configured to determine whether a current parameter is within the range of the parameter associated with the more past network data from the second network device than the other ranges of the parameter. In a further embodiment, the network controller is further configured to determine whether a state of the first network device comprises a first state. In a yet further embodiment, the network controller is further configured to change the behavior of the first network device when the current parameter is within the range of the parameter associated with the more past network data from the second network device than other ranges of the parameter and the state of the first network device comprises the first state.

In another embodiment, the network controller is further configured to send a message over the home-control network to the first network device, the message comprising a command configured to control the first network device. In another embodiment, the network controller is further configured to receive cloud data from a cloud server over a global network. In a further embodiment, the network controller is further configured to automatically control the behavior of the first network device based at least in part on the past network data from the second network device, the sensor data, and the cloud data.

According to a number of embodiments, the disclosure relates to a method to automatically control a water valve on a home-control network. The method comprises receiving with a network controller network data from one or more network devices on a home-control network. The home-control network is configured to propagate messages. The one or more network devices comprise at least a water valve and a leak detector, and the network data comprises at least a state of the water valve and a state of the leak detector. The method further comprises receiving with the network controller temperature data from a temperature sensor, and automatically controlling the state of the water valve on the home-control network based at least in part on the state of the water valve, the state of the leak detector, and the temperature data.

In an embodiment, the method further comprises determining, based on the network data, whether the water valve is closed. In another embodiment, the method further comprises determining, based on the network data, whether the leak detector detects a leak. In a further embodiment, the method further comprises determining, based on the temperature data, whether a freeze event exists. In a yet further embodiment, the method further comprises automatically controlling the water valve on the home-control network to drain water from pipes when the water valve is closed, the leak is detected, and the freeze event exists.

In an embodiment, the method further comprises sending a message to the water valve using at least one of the powerline signaling and the RF signaling. In another embodiment, the method further comprises sending a notification to a user reporting the state of the water valve on the home-control network after automatically controlling the water valve. In a further embodiment, the method further comprises sending a request to a user before automatically controlling the water valve. In a yet further embodiment, the method further comprises receiving sensor information over a global network and automatically controlling the state of the water valve on the home-control network based at least in part on network data, the temperature data, and the sensor information.

Certain embodiments relate to a system to automatically control a water valve on a home-control network. The system comprises a home-control network comprising at least a water valve and a leak detector, where the home-control network is configured to propagate messages, and a network controller configured to receive network data over the home-control network. The network data comprises at least a state of the water valve and a state of the leak detector. The network controller is further configured to receive temperature data from a temperature sensor and to automatically control the state of the water valve on the home-control network based at least in part on the network data and the temperature data.

In an embodiment, the network controller is further configured to determine, based on the network data, whether the water valve is closed. In another embodiment, the network controller is further configured to determine, based on the network data, whether the leak detector detects a leak. In a further embodiment, the network controller is further configured to determine, based on the temperature data, whether a freeze event exists. In a yet further embodiment, the network controller is further configured to automatically control the water valve on the home-control network to drain water from pipes when the water valve is closed, the leak is detected, and the freeze event exists.

In an embodiment, the network controller is further configured to send a message to the water valve using at least one of the powerline signaling and the RF signaling. In another embodiment, the network controller is further configured to send a notification to a user reporting the state of the water valve on the home-control network after automatically controlling the water valve. In a further embodiment, the network controller is further configured to send a request to a user before automatically controlling the water valve. In a yet further embodiment, the network controller is further configured to receive sensor information over a global network and automatically control the state of the water valve on the home-control network based at least in part on the network data, the temperature data, and the sensor information.

Network Device Adaptive Learning

Network devices typically control an actuation, such as opening/closing a switch, opening/closing a valve, locking/unlocking a lock, raising/lowering a window blind, and the like, and receive commands from the cloud server or the network controller to actuate. In addition, the use can manually activate or deactivate the device, overriding any automatic actuation. The network devices build scenes and timers based on activations and instant device status.

The network devices receive sensor inputs from sensors local to the device, such as temperature sensors, moisture sensors, motion sensors, for example, and physical actions from the user. Based on the sensor input and the user's actions, the network device determines whether to change its state.

According to a number of embodiments, the disclosure relates to a method to automatically control a network device on a home-control network. The method comprises receiving at a first network device on a home-control network message data from a second network device over the home-control network. The first network device is configured to change an operation of the first network device. The home-control network is configured to propagate messages, and the message data from the second network device associated with a state of the second network device. The method further comprises receiving sensor data from a sensor configured to measure a first parameter, receiving user inputs in response to manual actions of a user to change the operation of the first network device, where the user inputs are received independently of the home-control network, storing in memory past user inputs that changed the operation of the first network device, and automatically changing the state of the first network device with the first network device based at least in part on the message data from the second network device, the sensor data, and the past user inputs.

In an embodiment, the method further comprises analyzing the past user inputs to determine a range of the first parameter in which more past user inputs occurred than occurred in other ranges of the first parameter. In another embodiment, the method further comprises determining, based on the first sensor data and the past user inputs, whether a current first parameter is within the range of the first parameter in which the more past user inputs occurred than occurred in the other ranges of the first parameter. In a further embodiment, the method further comprises determining based on the message data from the second network device whether the state of the second network device comprises a first state. In a yet further embodiment, the method further comprises changing the operation of the first network device with the first network device when the current first parameter is within the range of the first parameter in which the more past user inputs occurred than in the other ranges of the first parameter and the state of the second network device comprises the first state.

In an embodiment, the method further comprises sending a request over the home-control network using one or more of the powerline signaling and the RF signaling before changing the operation of the first network device. In another embodiment, the method further comprises sending a message reporting a status of the first network device over the home-control network using one or more of the powerline signaling and the RF signaling. In a further embodiment, the method further comprises accessing second sensor information to provide a second parameter and determining, based on the second sensor information and the past user inputs, whether a current second parameter is within a range of the second parameter in which more past user inputs occurred than occurred in other ranges of the second parameter. In a yet further embodiment, the method further comprises automatically changing the operation of the first network device with the first network device when the current first parameter is within the range of the first parameter in which the more past user inputs occurred than in the other ranges of the first parameter, the current second parameter is within the range of the second parameter in which the more past user inputs occurred than occurred in the other ranges of the second parameter, and the state of the second network device comprises the first state.

Certain embodiments relate to a system to automatically control a network device on a home-control network. The system comprises a first network device configured to receive messages over the home-control network, where the first network device is further configured to change an operation of the first network device, the home-control network configured to propagate messages, a second network device configured to send message data over the home-control network, the first network device further configured to receive the message data from the second network device over the home-control network, where the message data from the second network device associated with a state of the second network device, and a sensor configured to provide sensor data measuring a first parameter, the first network device further configured to receive the sensor data. The first network device is further configured to receive user inputs in response to manual actions of a user to change the operation of the first network device, where the user inputs are received independently of the home-control network, to store in memory past user inputs that changed the operation of the first network device, and to automatically change the state of the first network device based at least in part on the message data from the second network device, the sensor data, and the past user inputs.

In an embodiment, the first network device is further configured to analyze the past user inputs to determine a range of the first parameter in which more past user inputs occurred than occurred in other ranges of the first parameter. In another embodiment, the first network device is further configured to determine, based on the first sensor data and the past user inputs, whether a current first parameter is within the range of the first parameter in which the more past user inputs occurred than occurred in the other ranges of the first parameter. In a further embodiment, the first network device is further configured to determine based on the message data from the second network device whether the state of the second network device comprises a first state. In a yet further embodiment, the first network device is further configured to change the operation of the first network device when the current first parameter is within the range of the first parameter in which the more past user inputs occurred than in the other ranges of the first parameter and the state of the second network device comprises the first state.

In an embodiment, the first network device is further configured to send a request over the home-control network using one or more of the powerline signaling and the RF signaling before changing the operation of the first network device. In another embodiment, the first network device is further configured to send a message reporting a status of the first network device over the home-control network using one or more of the powerline signaling and the RF signaling. In a further embodiment, the first network device is further configured to access second sensor information to provide a second parameter and determine, based on the second sensor information and the past user inputs, whether a current second parameter is within a range of the second parameter in which more past user inputs occurred than occurred in other ranges of the second parameter. In a yet further embodiment, first network device is further configured to automatically change the operation of the first network device when the current first parameter is within the range of the first parameter in which the more past user inputs occurred than in the other ranges of the first parameter, the current second parameter is within the range of the second parameter in which the more past user inputs occurred than occurred in the other ranges of the second parameter, and the state of the second network device comprises the first state.

According to a number of embodiments, the disclosure relates to a method to automatically control a water valve. The method comprises receiving at a water valve controller on a home-control network a state of a water valve from a valve-state sensor over the home-control network and temperature data from a temperature sensor, where the home-control network is configured to propagate messages, the water valve controller configured to change a state of the water valve, receiving user inputs in response to manual actions of a user to open and close the water valve, receiving temperature data from a temperature sensor, storing in memory past user inputs, and automatically changing the state of the water valve with the water valve controller based at least in part on the state of the water valve, the temperature data, and the past user inputs.

In an embodiment, the method further comprises analyzing the past user inputs to determine a temperature range in which more past user inputs occurred than occurred in other temperature ranges. In another embodiment, the method further comprises determining, based on the temperature data and the past user inputs, whether a current temperature is within the temperature range in which the more past user inputs occurred than occurred in the other temperature ranges. In a further embodiment, the method further comprises determining whether the state of the water valve comprises an open state. In a yet further embodiment, the method further comprises closing with the water valve controller the water valve when the temperature is within the temperature range in which the more past user inputs occurred than in the other temperature ranges and the state of the water valve comprises the open state.

In an embodiment, the method further comprises sending a request over the home-control network using one or more of the powerline signaling and the RF signaling before closing the water valve. In another embodiment, the method further comprises sending a message reporting a status of the water valve over the home-control network using one or more of the powerline signaling and the RF signaling. In a further embodiment, the method further comprises accessing calendar information to provide a current day of the week and determining, based on the calendar information and past user inputs, whether the current day of the week comprises the day of the week in which more past user inputs occurred than in other days of the week. In a yet further embodiment, the method further comprises automatically closing the water valve with the water valve controller when the temperature is within the temperature range in which the more past user inputs occurred than in the other temperature ranges, the current day of the week comprises the day of the week in which the more past user inputs occurred than in the other days of the week, and the state of the water valve comprises the open state.

Certain embodiments relate to a water valve controller on a home-control network to automatically control a water valve. The water valve controller comprises receiver circuitry configured to receive messages from a home-control network, where the home-control network is configured to propagate the messages, a temperature sensor configured to provide temperature data, and a processor configured to receive via the receive circuitry a state of a water valve from a water valve sensor over the home control network. The water valve is configured to be controlled by the water valve controller and by manual actions of a user. The processor is further configured to receive user actions in response to the manual actions of the user to open and close the water valve, to store in memory past user actions, and to automatically send a control signal to the water valve to change the state of the water valve based at least in part on the state of the water valve, the temperature data, and the past user actions.

In an embodiment, the processor is further configured to analyze the past user actions to determine a temperature range in which more past user actions occurred than occurred in other temperature ranges. In another embodiment, the processor is further configured to determine, based on the temperature data and the past user actions, whether a current temperature is within the temperature range in which the more past user actions occurred than in the other temperature ranges. In a further embodiment, the processor is further configured to determine whether the state of the water valve comprises an open state. In a yet further embodiment, the processor is further configured to send a control signal to close the water valve when the temperature is within the temperature range in which the more past user actions occurred than in the other temperature ranges and the state of the water valve comprises the open state.

In an embodiment, the water valve controller further comprises transmitter circuitry configured to transmit messages over the home-control network, wherein the processor is further configured to send a request over the home-control network via the transmitter circuitry using one or more of the powerline signaling and the RF signaling before closing the water valve. In another embodiment, the water valve controller further comprises transmitter circuitry configured to transmit messages over the home-control network, where the processor is further configured to send a message reporting a status of the water valve over the home-control network via the transmitter circuitry using one or more of the powerline signaling and the RF signaling.

In a further embodiment, the processor is further configured to access calendar information to provide a current day of the week and to determine, based on the calendar information and the past user actions, whether the current day of the week comprises the day of the week in which more past user actions occurred than in other days of the week. In a yet further embodiment, the processor is further configured to automatically send a control signal to the water valve to change the state of the water valve when the temperature is within the temperature range in which the more past user actions occurred than in the other temperature ranges, the current day of the week comprises the day of the week in which the more past user actions occurred than in the other days of the week, and the state of the water valve comprises the open state.

Terminology

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." The words "coupled" or "connected", as generally used herein, refer to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or" in reference to a list of two or more items, that word covers all of the following interpretations of the word: any of the items in the list, all of the items in the list, and any combination of the items in the list.

Moreover, conditional language used herein, such as, among others, "can," "could," "might," "may," "e.g.," "for example," "such as" and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

The above detailed description of certain embodiments is not intended to be exhaustive or to limit the invention to the precise form disclosed above. While specific embodiments of, and examples for, the invention are described above for illustrative purposes, various equivalent modifications are possible within the scope of the invention, as those ordinary skilled in the relevant art will recognize. For example, while processes, steps, or blocks are presented in a given order, alternative embodiments may perform routines having steps, or employ systems having blocks, in a different order, and some processes, steps, or blocks may be deleted, moved, added, subdivided, combined, and/or modified. Each of these processes, steps, or blocks may be implemented in a variety of different ways. Also, while processes, steps, or blocks are at times shown as being performed in series, these processes, steps, or blocks may instead be performed in parallel, or may be performed at different times.

The teachings of the invention provided herein can be applied to other systems, not necessarily the systems described above. The elements and acts of the various embodiments described above can be combined to provide further embodiments.

While certain embodiments of the inventions have been described, these embodiments have been presented by way of example only, and are not intended to limit the scope of the disclosure. Indeed, the novel methods and systems described herein may be embodied in a variety of other forms; furthermore, various omissions, substitutions, and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A method to automatically control a water valve on a user's home-control mesh network, the method comprising:
electronically receiving, with cloud-based computer hardware, network data from a plurality of home-control mesh networks, each home-control mesh network comprising a network controller and at least a water valve, each home-control mesh network further comprising a plurality of network devices, each network device of the plurality of network devices configured to retransmit messages intended for others of the plurality of network devices using powerline signaling and radio frequency signaling up to a predetermined number of retransmissions, the messages comprising commands to control a state of the water valve, the powerline signaling comprising message data modulated onto a carrier signal and the modulated carrier signal being added to a powerline waveform, the radio frequency signaling comprising the message data modulated onto a radio frequency waveform;
aggregating, with cloud-based computer hardware, the network data associated with the state of water valves from the plurality of home-control mesh networks within a geographic area of the user's home control mesh network;
receiving, with cloud-based computer hardware, weather information for the geographic area from a weather service over a global network;
receiving, with cloud-based computer hardware, location information comprising a location of a user from a geo-location device over the global network;
generating, with cloud-based computer hardware, a command to control the state of a user's water valve, the command based at least in part on the aggregated network data, the weather information, and the location information and comprising the message data; and
transmitting, with the cloud-based computer hardware, the message data to the user's network controller, wherein the user's network controller is configured to modulate the message data onto the carrier signal, to add the modulated carrier signal to the powerline waveform for transmission over powerlines of the user's home-control mesh network, to modulate the message data onto the radio frequency waveform, and to transmit the radio frequency waveform for propagation over the user's home-control mesh network.

2. The method of claim 1 further comprising determining, based on the aggregated network data, whether a number of the water valves associated with the plurality of home-control mesh networks within the geographic area have been enabled to drain water pipes.

3. The method of claim 2 further comprising determining, based on the weather information, whether a freeze event is expected within a time period.

4. The method of claim 3 further comprising determining, based on the location information, whether the user is away from the user's home-control mesh network.

5. The method of claim 4 further comprising automatically controlling the water valve on the user's home-control mesh network to drain water from the pipes when the number is greater than a threshold, the freeze event is expected within the time period, and the user is away.

6. The method of claim 5 further comprising sending a message over the global network to the network controller associated with the user's home-control mesh network, the message comprising a command configured to control the water valve on the user's home-control mesh network.

7. The method of claim 6 wherein the network controller associated with the user's home-control mesh network is configured to send the message to the water valve on the user's home-control mesh network using the powerline signaling and the RF signaling.

8. The method of claim 1 further comprising sending a notification to the user reporting the state of the water valve on the user's home control mesh network after automatically controlling the water valve.

9. The method of claim 1 further comprising sending a request to the user before automatically controlling the water valve.

10. A system to automatically control a water valve on a user's home-control mesh network, the system comprising:
cloud-based computer hardware configured to receive network data from a plurality of home-control mesh networks, each home-control mesh network comprising a network controller and at least a water valve, each home-control mesh network further comprising a plurality of network devices, each network device configured to retransmit messages intended for others of the plurality of network devices using powerline signaling and radio frequency signaling up to a predetermined number of retransmissions, the messages comprising commands to control a state of the water valve, the powerline signaling comprising message data modulated onto a carrier signal and the modulated carrier signal being added to a powerline waveform, the radio frequency signaling comprising modulating the message data onto a radio frequency waveform;
cloud-based computer hardware configured to aggregate the network data associated with the state of water valves from the plurality of home-control mesh networks within a geographic area of the user's home control mesh network;
cloud-based computer hardware configured to receive weather information for the geographic area from a weather service over a global network and to receive location information comprising a location of a user from a geo-location device over the global network;

cloud-based computer hardware configured to analyze the aggregated network data, the weather information, and the location information;

cloud-based computer hardware configured to generate a command to control the state of the user's water valve based at least in part on the analysis, the command comprising message data; and cloud-based computer hardware configured to transmit the message data to the user's network controller, wherein the user's network controller is configured to modulate the message data onto the carrier signal, to add the modulated carrier signal to the powerline waveform for transmission over powerlines of the user's home-control mesh network, to modulate the message data onto the radio frequency waveform, and to transmit the radio frequency waveform for propagation over the user's home-control mesh network.

11. The system of claim 10 wherein the cloud-based computer hardware is further configured to determine, based on the aggregated network data, whether a number of the water valves associated with the plurality of home-control mesh networks within the geographic area have been enabled to drain water pipes.

12. The system of claim 11 wherein the cloud-based computer hardware is further configured to determine, based on the weather information, whether a freeze event is expected within a time period.

13. The system of claim 12 wherein the cloud-based computer hardware is further configured to determine, based on the location information, whether the user is away from the user's home-control mesh network.

14. The system of claim 13 wherein the cloud-based computer hardware is further configured to automatically control the water valve on the user's home-control mesh network to drain water from the pipes when the number is greater than a threshold, the freeze event is expected within the time period, and the user is away.

15. The system of claim 14 wherein the cloud-based computer hardware is further configured to send a message over the global network to the network controller associated with the user's home-control mesh network, the message comprising a command configured to control the water valve on the user's home-control mesh network.

16. The system of claim 15 wherein the network controller associated with the user's home-control mesh network is configured to send the message to the water valve on the user's home-control mesh network using the powerline signaling and the RF signaling.

17. The system of claim 10 wherein the cloud-based computer hardware is further configured to send a notification to the user reporting the state of the water valve on the user's home control mesh network.

18. The system of claim 10 wherein the cloud-based computer hardware is further configured to send a request to the user to control the water valve.

* * * * *